(12) United States Patent
Takahashi et al.

(10) Patent No.: US 8,225,486 B2
(45) Date of Patent: Jul. 24, 2012

(54) METHOD OF MANUFACTURING A PERPENDICULAR MAGNETIC RECORDING HEAD

(75) Inventors: Toshio Takahashi, Kanagawa (JP); Akihiro Namba, Kanagawa (JP); Masafumi Mochizuki, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 429 days.

(21) Appl. No.: 12/487,306

(22) Filed: Jun. 18, 2009

(65) Prior Publication Data

US 2009/0313811 A1 Dec. 24, 2009

(30) Foreign Application Priority Data

Jun. 18, 2008 (JP) ................................ 2008-159259

(51) Int. Cl.
*G11B 5/127* (2006.01)
*H04R 31/00* (2006.01)

(52) U.S. Cl. ............... 29/603.09; 29/603.11; 29/603.13; 29/603.14; 29/603.16; 29/603.18; 360/121; 360/122; 360/317; 451/5; 451/8; 451/10; 451/36; 451/37

(58) Field of Classification Search .. 29/603.09–603.12, 29/603.15, 603.16, 603.18; 360/121, 122, 360/317; 451/5, 8, 10, 36, 37, 41
See application file for complete search history.

(56) References Cited

U.S. PATENT DOCUMENTS

| | | | | |
|---|---|---|---|---|
| 2006/0028770 A1* | 2/2006 | Etoh et al. | ...................... | 360/313 |
| 2007/0096725 A1 | 5/2007 | Inomata | ........................ | 324/210 |
| 2009/0153995 A1* | 6/2009 | Jang | ................................ | 360/31 |

FOREIGN PATENT DOCUMENTS

| | | |
|---|---|---|
| JP | 06/187622 | 7/1994 |
| JP | 2000/076633 | 3/2000 |
| JP | 2006/309836 | 11/2006 |
| JP | 2006309826 A | 11/2006 |
| JP | 2007122283 A | 5/2007 |
| JP | 2007122823 | 5/2007 |

OTHER PUBLICATIONS

S.Y. Yamamoto and S. Schultz, "Scanning magnetoresistance microscopy (SMRM): Imaging with a MR head" IEEE Transactions on Magnetics, vol. 33, Issue 1, Jan. 1997, p. 891-896.

* cited by examiner

*Primary Examiner* — Paul D Kim
(74) *Attorney, Agent, or Firm* — Zilka-Kotab, PC

(57) ABSTRACT

In a manufacturing process of a head slider, a plurality of head elements are formed on a wafer, each head element comprising: a return pole, a coil, and a main pole. The wafer is cut into respective head elements so that individual head sliders are formed. A ratio of an amplitude of an electrical signal applied to the coil of the write head on the head slider to an amplitude of output from an independent magnetic field sensor not embedded in the head slider is calculated, where the independent magnetic field sensor is disposed near the main pole so as to be opposed to the main pole across the air bearing surface, and where the ratio is calculated while a displacement between the main pole and the magnetic field sensor is swept. A flare point height of the main pole is determined from the calculated amplitude ratio.

17 Claims, 23 Drawing Sheets

(a)

(b)

(a)

(b)

METHOD OF MANUFACTURING A PERPENDICULAR MAGNETIC RECORDING HEAD

RELATED APPLICATIONS

The present application claims the priority of a Japanese patent application filed Jun. 18, 2008 under application number 2008-159259, which is incorporated herein by reference.

FIELD OF THE INVENTION

The present invention relates to a method of manufacturing a thin-film magnetic head for mounting in a magnetic recording device such as magnetic disk drive, and particularly relates to a method of manufacturing a perpendicular magnetic recording head.

BACKGROUND OF THE INVENTION

One version or another of a magnetic disk storage device has been on the market since about 1956. The size of magnetic storage devices has been successively reduced over time, and recording density has steadily increased. The recording density of magnetic storage devices abruptly accelerated to an annual increase rate of about 60% due to development of a Magneto-Resistive Effect (MR) element in 1992. In addition, the recording density of magnetic storage devices further accelerated to an annual increase rate of about 100% due to the development of a Giant Magneto-Resistive Effect (GMR) element in 1997. However, in the middle of 2000, recording density gradually approached its limit given a conventional magnetic recording principle of longitudinal recording, and increases in the recording density of magnetic storage devices dropped to an increase of about 40% per year. However, since the perpendicular magnetic recording technology was put into practical use in 2005, it is now approximated that growth of the recording density of magnetic storage devices may be recovered to an increase of about 100% per year.

With conventional longitudinal recording technology, magnetic data is horizontally disposed on a disk surface, and magnetic poles of the data bits repel each other which hinder significant increases in recording density. Even if the thickness of a recording medium is reduced to suppress repulsion between magnetic poles of the data bits and higher recording density is achieved, a problem of thermal agitation is not avoidable; that is, recording magnetization may be unstable, even at room temperature. Therefore, it has been difficult to achieve recording densities of more than about 15.5 Gbit/square centimeter (100 Gbit/square inch) with conventional longitudinal recording technology.

On the other hand, unlike longitudinal recording technology, perpendicular recording technology has the following characteristic: as linear recording density is increased, a demagnetizing field exerted between adjacent bits is decreased, and recording magnetization becomes more stabilized. Therefore, perpendicular recording technology has a feature that causes recording magnetization to become more stabile with increases in the recording density, which is effective for achieving ultra-high density recording. In the perpendicular magnetic recording technology, a magnetic field is applied to a recording layer of a two-layer recording medium interposed between a soft-magnetic underlayer and a single-pole head, so that a magnetic material in the recording layer is magnetized in a direction perpendicular to the disk surface and thus information is recorded. Flare point height of a main pole of a perpendicular magnetic recording head is reduced in order to obtain a large recording magnetic field. However, when the height is too low, write blurring may occur in recording, and when the height is too high, the recorded signal may be erased due to residual magnetization.

In longitudinal recording technology, magnetic pole height accuracy, also known as throat height accuracy, is not as stringently defined for the write element. However, in perpendicular recording technology, extremely high accuracy is used for flare point height for the reason set forth above. On the other hand, the read element height uses a high dimensional accuracy in the perpendicular recording technology and in the longitudinal recording technology, which is satisfied simultaneously by accurate definition of the flare point height.

Such dimensions are formed by lapping an air bearing surface of a magnetic head slider to an amount where each element has an appropriate dimension. A method for read element height estimation includes a method where an electric current is directly flowed through an element, and a dimension is calculated from a resistance value of the element. Another method includes flowing an electric current into a guide resistance formed near the element, and a dimension of the guide resistance is calculated from a resistance value thereof, which is assumed to be an estimated value of height of the actual read element. However, a write element is not structured in such a way that electric current flows into the portion to have high dimensional accuracy. In addition, for the write element, a guide resistance is extremely difficult to form in a shape in accordance with a flare point.

As proposed in Jap. Pat. App. No. JP-A-2006-309826, a method of checking a state of a write element without using the guide resistance or the like is given, in which a thin film-like perpendicular magnetic-recording medium (pseudo medium) is formed on an air bearing surface of a magnetic head slider to be examined, and the pseudo medium is subjected to perpendicular magnetic recording from a write element on the magnetic head slider. A write state in the recording is read using a magneto-optical effect microscope or a magnetic force microscope, thereby estimating a magnetic domain structure of the write element. Consequently, quality of a magnetic head is determined. However, in the method, a dimension of an element may not be estimated. In addition, since a medium is used for checking, results of observation and measurements may vary depending on variation in characteristic of an individual medium.

Jap. Pat. App. No. JP-A-2007-122283 discloses a method of measuring distribution of a magnetic field in a plane parallel to an air bearing surface by using a checking medium and a magnetic force microscope (MFM). However, the reference does not describe distribution of a magnetic field in a direction perpendicular to an air bearing surface. Jap. Pat. App. No. JP-A-6-187622 discloses a method, in which an electromagnetic induction magnetic head has one element used as both write and read elements, and the gap depth of a write element is estimated based on characteristics of the relationship between recording current and reading output in the one element. However, the method is unrelated to magnetic field intensity distribution around the write element. Furthermore, Jap. Pat. App. No. JP-A-2000-076633 discloses a method of measuring a recording characteristic of a write element by forming a fixed magnetic sensor within a wafer. However, the method does not allow for estimation of a magnetic field intensity in a three-dimensional space near the write element.

According to S. Y. Yamamoto and S. Schultz, Scanning Magnetoresistance Microscopy (SMRM): Imaging with a MR Head, J. Appl. Phys. 81, 4698 (1997), a method is shown where information recorded in a separately prepared medium is measured and visualized by a different magnetic read/write element. However, even in this case, estimation of an element dimension is not supposed. In addition, since a medium is used for measurement, measurement results may vary depending on the medium.

SUMMARY OF THE INVENTION

According to one embodiment, a method of manufacturing a perpendicular magnetic recording head comprises a main pole having a flare point at which a width in a cross-track direction begins to increase, wherein a width of a portion of the main pole is constant in the cross-track direction from the flare point to an air bearing surface. The magnetic recording head also includes a return pole being magnetically coupled with the main pole at a side opposite to the air bearing surface and a coil interlinked with a magnetic circuit comprised of the main pole and the return pole. The magnetic recording head is formed by a method which includes forming a plurality of head elements on a wafer, each head element comprising: the return pole, the coil, and the main pole. The method also includes cutting the wafer into respective head elements so that individual head sliders are formed and calculating a ratio of an amplitude of an electrical signal applied to the coil of the write head on the head slider to an amplitude of output from an independent magnetic field sensor not embedded in the head slider, wherein the independent magnetic field sensor is disposed near the main pole so as to be opposed to the main pole across the air bearing surface, wherein the ratio is calculated while the displacement between the main pole and the magnetic field sensor is swept. The method further includes determining a flare point height of the main pole from the calculated amplitude ratio.

According to another embodiment, a method of manufacturing a perpendicular magnetic recording head includes many steps. The magnetic recording head comprises a main pole including a flare point defined as a point where a width in a cross-track direction begins to increase and a portion of the main pole being constant in width in the cross-track direction from the flare point to an air bearing surface. The magnetic recording device also includes a return pole being magnetically coupled with the main pole at a side opposite to the air bearing surface and a coil interlinking with a magnetic circuit including the main pole and the return pole. The magnetic recording head is formed by a method which includes forming a plurality of head elements on a wafer, each head element having the return pole, the coil, and the main pole and cutting the wafer into the respective head elements so that individual head sliders are formed. The method also includes calculating a ratio of an amplitude of an electric signal applied to the coil on the head slider to an amplitude of output from an independent magnetic field sensor not embedded in the slider, wherein the magnetic field sensor is disposed near the main pole so as to be opposed to the main pole across the air bearing surface and sweeping a displacement between the main pole and the magnetic field sensor. In addition, the method includes estimating a flare point height of the main pole from the calculated amplitude ratio, estimating a dimension in the cross-track direction of the main pole from the calculated amplitude ratio, and sorting non-defective products and defective products based on the estimated flare point height of the main pole and the estimated dimension in the cross-track direction thereof, respectively.

A method of manufacturing a perpendicular magnetic recording head, according to yet another embodiment, including a write head having a main pole, wherein the main pole includes a flare point at a point where a width in a cross-track direction begins to increase and a portion of the main pole being constant in width in the cross-track direction from the flare point to an air bearing surface includes many steps. The magnetic recording head also includes a return pole being magnetically coupled with the main pole at a side opposite to the air bearing surface, a coil interlinking with a magnetic circuit including the main pole and the return pole, and a read head disposed adjacently to the write head. The read head comprises a read element and upper and lower magnetic shields interposing the read element between them. The method of forming the magnetic head includes forming a plurality of head elements on a wafer, each head element having the read head and the write head and cutting the wafer into row bars, each row bar including a plurality of head elements. The method further includes lapping a cut surface of each of the row bars such that a flare point height of the main pole included in a head element on each row bar and element height of the read element are determined and cutting each of the row bars into the respective head elements so that individual head sliders are formed. In addition, the method includes calculating a ratio of an amplitude of an electrical signal applied to the coil on the head slider to an amplitude of output from an independent magnetic field sensor not embedded in the slider, wherein the magnetic field sensor is disposed near the main pole so as to be opposed to the main pole across the air bearing surface, sweeping a displacement between the main pole and the magnetic field sensor, estimating a flare point height of the main pole from the calculated amplitude ratio, and measuring a resistance value of the read element to measure element height thereof. Furthermore, the method includes comparing the estimated flare point height of the main pole to the measured element height of the read element, calculating an overlay displacement between the write head and the read head on the wafer, and in the lapping step, adjusting a tilt angle of the row bar based on the calculated relative displacement, thereby correcting the overlay displacement.

According to yet another embodiment, a method of manufacturing a perpendicular magnetic recording head comprising a write head which includes a main pole which comprises a flare point at a point where a width in a cross-track direction begins to increase and a portion being constant in width in the cross-track direction from the flare point to an air bearing surface includes many steps. The magnetic recording head also includes a return pole being magnetically coupled with the main pole at a side opposite to the air bearing surface, a coil interlinking with a magnetic circuit including the main pole and the return pole, and a read head disposed adjacently to the write head, the read head comprising a read element and upper and lower magnetic shields interposing the read element between them. The method includes the steps of forming a plurality of head elements on a wafer, each head element having the read head and the write head and cutting the wafer into row bars, each row bar including a plurality of head elements. The method also includes the steps of cutting each of the row bars into respective head elements so that individual head sliders are formed, lapping a surface of each of the head sliders to become an air bearing surface such that a flare point height of the main pole included in a head element and an element height of the read element on the head slider are determined, calculating a ratio of an amplitude of an electrical signal applied to the coil on the head slider to an amplitude of output from an independent magnetic field sensor not embedded in the slider, wherein the magnetic field sensor is disposed near the main pole so as to be opposed to the main pole across the air bearing surface, and sweeping a displacement between the main pole and the magnetic field sensor. In addition, the method includes the steps of estimating a flare point height of the main pole from the calculated amplitude ratio, measuring a resistance value of the read element to determine an element height thereof, and comparing the estimated flare point height of the main pole to the measured element height of the read element. Furthermore, the method includes the steps of calculating an overlay displacement between the read head and the write head on the wafer based on the comparison and in the lapping step, adjusting a tilt angle of the head slider based on the calculated relative displacement, thereby correcting the overlay displacement.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1:
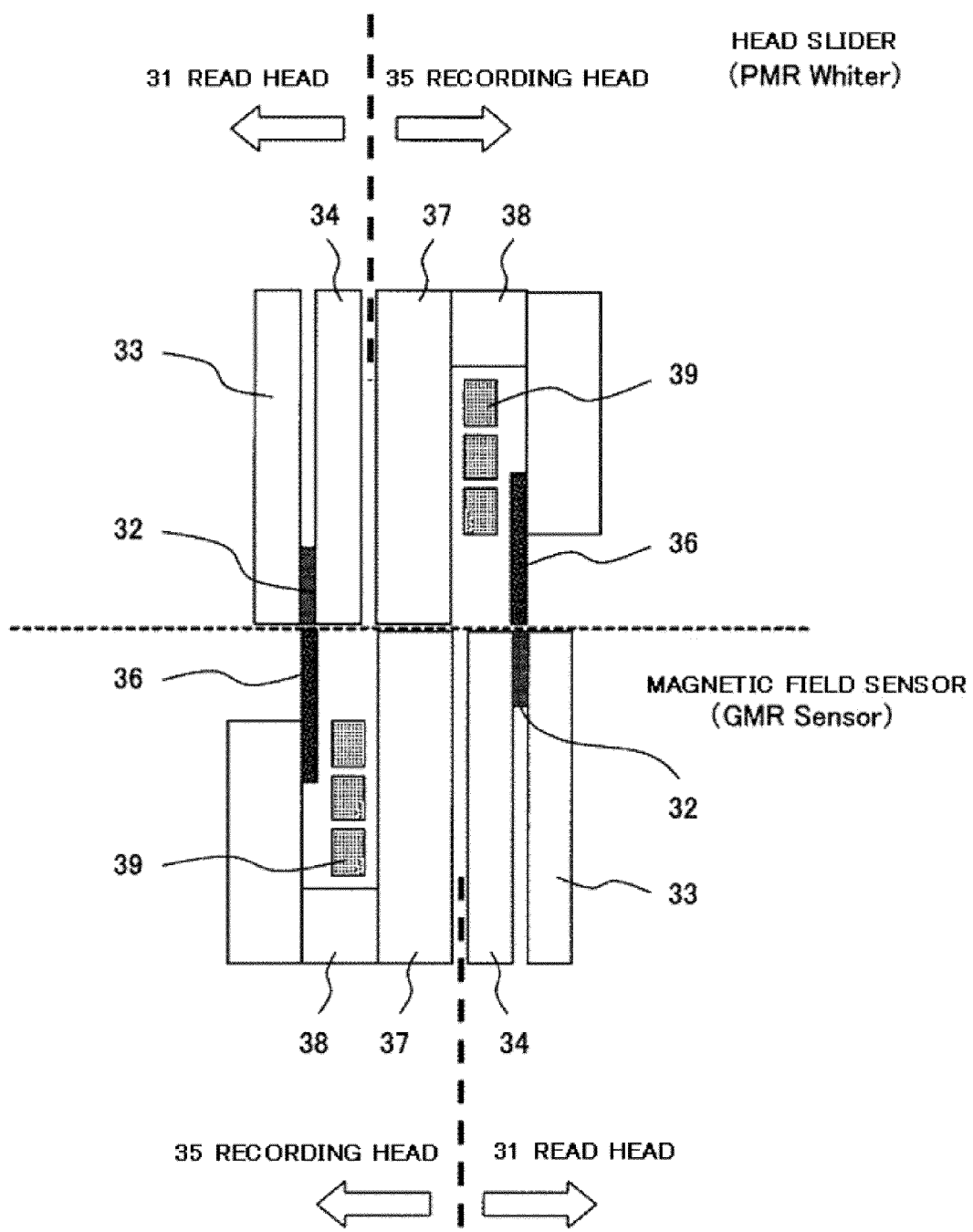
FIG. 1 is a schematic view showing a layout using a magneto-resistive element as a magnetic field sensor for measuring a magnetic field intensity around a main pole according to an example of one embodiment.

Height of a main pole of a write element of a thin film magnetic head and height of a read element thereof are finally established in a lapping process of a flying height of a magnetic head slider. A dimension of a flare point height of the main pole of the write element may be significantly varied due to factors such as (1) alignment accuracy in exposure in the wafer process during forming of a write element and a read element, such as the elements being off by several micrometers from each other in the film deposition direction, (2) milling accuracy during forming of each element in accordance with an exposed pattern, (3) deviation of an air bearing surface from a right angle with respect to a film surface during row bar cutting and air bearing surface lapping in a slider process, and (4) variations in a dimension of a processed height of a read element as an air bearing surface is processed with the height of the read element as a reference.

Displacement may occur between a read element and a write element in the direction perpendicular to the air bearing surface due to combined factors in a wafer process, such as misalignment in exposure that occurs during forming of the read element and the write element on a wafer, and milling accuracy during the forming of each element in accordance with an exposed pattern. The displacement may be corrected by the following operation: a slider is tilted during an air bearing surface lapping process, thereby removing extra material so that each of the read element and the write element has an appropriate dimension.

However, to appropriately correct such displacement, values for both a dimension of the read element and a dimension of the flare point height of the write element need to be known during processing. A method for the read element height estimation includes a method where an electric current is directly flowed into an element, and a dimension is calculated from a resistance value of the element. In another method, electric current is flowed into a guide resistance formed near the element, and a dimension of the guide resistance is calculated from a resistance value thereof, which is assumed as an estimated value of height of the actual write element. However, a write element is not structured in such a way that electric current flows into the portion having high dimensional accuracy. In addition, for the write element, a guide resistance is extremely difficult to be formed in a shape in accordance with a flare point. Furthermore, variation in milling during forming a main pole of a write element may affect only a shape of the main pole, and may not affect the guide resistance. This leads to a cause of further increase in dimension error with respect to an actual dimension as flare point height is estimated with the guide resistance as a reference.

As dimension control processing is performed based on estimated values, errors are included, and the quality of a write head is not known until a later stage of a manufacturing process of the slider; that is, until an inspection step where the slider is mounted on a suspension, and a magnetic recording medium is actually subjected to reading/writing of a signal. Therefore, a total production yield is reduced, and in addition, loss in production control in this regard may be caused by a slider, that may already be defective during a manufacturing process, being assembled into a final product.

Therefore, in manufacturing a perpendicular magnetic recording head according to one embodiment, to perform a dimension-controlled lapping process so that a dimension of a read element and a dimension of a flare point height of a write element are satisfied together, the dimension of the flare point height of the write element is desirably formed to be a dimension allowing a recording magnetic field generated from the write element to be optimum, based on direct measurement of intensity of the recording magnetic field rather than an indirect measurement method via a guide resistance or a recording medium. On the other hand, from the viewpoint of production control according to another embodiment, it is similarly desirable to establish a manufacturing process in which quality of a write element is determined so that a defective product is removed in an early stage of a manufacturing process most of the time.

A method of manufacturing a perpendicular magnetic recording head according to one embodiment is characterized by having a step where a ratio is calculated of an amplitude of an electric signal applied to a coil of a write head to amplitude of a signal obtained as output from an independent magnetic field sensor not embedded in the said slider, which is disposed near a main pole of a write head so as to be opposed to the main pole across the air bearing surface, and a flare point height of the main pole and a dimension in a cross-track direction thereof are estimated from a spatial distribution of values, each value being obtained as an amplitude ratio of the sensor output in accordance with spatial distribution of a magnetic field.

A method of manufacturing a perpendicular magnetic recording head according to another embodiment is characterized by having a step where non-defective products and defective products are sorted in a stage of a head slider based on the estimated flare point height of the main pole and the estimated dimension in the cross-track direction thereof, respectively.

A method of manufacturing a perpendicular magnetic recording head according to yet another embodiment is characterized by the method including a step where a flare point height of a main pole is estimated by a particular head slider and is compared to height of a read element estimated through measurement of a resistance value of the read element. In this fashion, the displacement between a read head and a write head on a wafer in the direction perpendicular to the air bearing surface is calculated, and during subsequent lapping of a row bar or a head slider, tilt angle of the row bar or head slider is adjusted based on the calculated relative displacement, thereby resulting in the overlay displacement being corrected.

According to one embodiment of the invention, flare point height of a main pole can be estimated in a stage of a head slider before the head slider is mounted on a suspension. Thus, since the relative displacement between a read head and write head on a wafer can be corrected during lapping of a row bar or head slider, a product yield can be improved. Furthermore, since a dimension in a cross-track direction of a main pole can be estimated in a stage of a head slider, non-defective products and defective products can be sorted by a main pole dimension in an early stage of a manufacturing process, respectively. This may prevent defective products from being passed to a later stage of a manufacturing process, which may reduce loss in production control.

Before describing a method of manufacturing a perpendicular magnetic recording head according to an embodiment of the invention, a configurational and an operational concept of a thin film magnetic head (perpendicular magnetic recording head), and basic steps of a manufacturing process of a magnetic head slider are first described for facilitating understanding.

Figure 2:
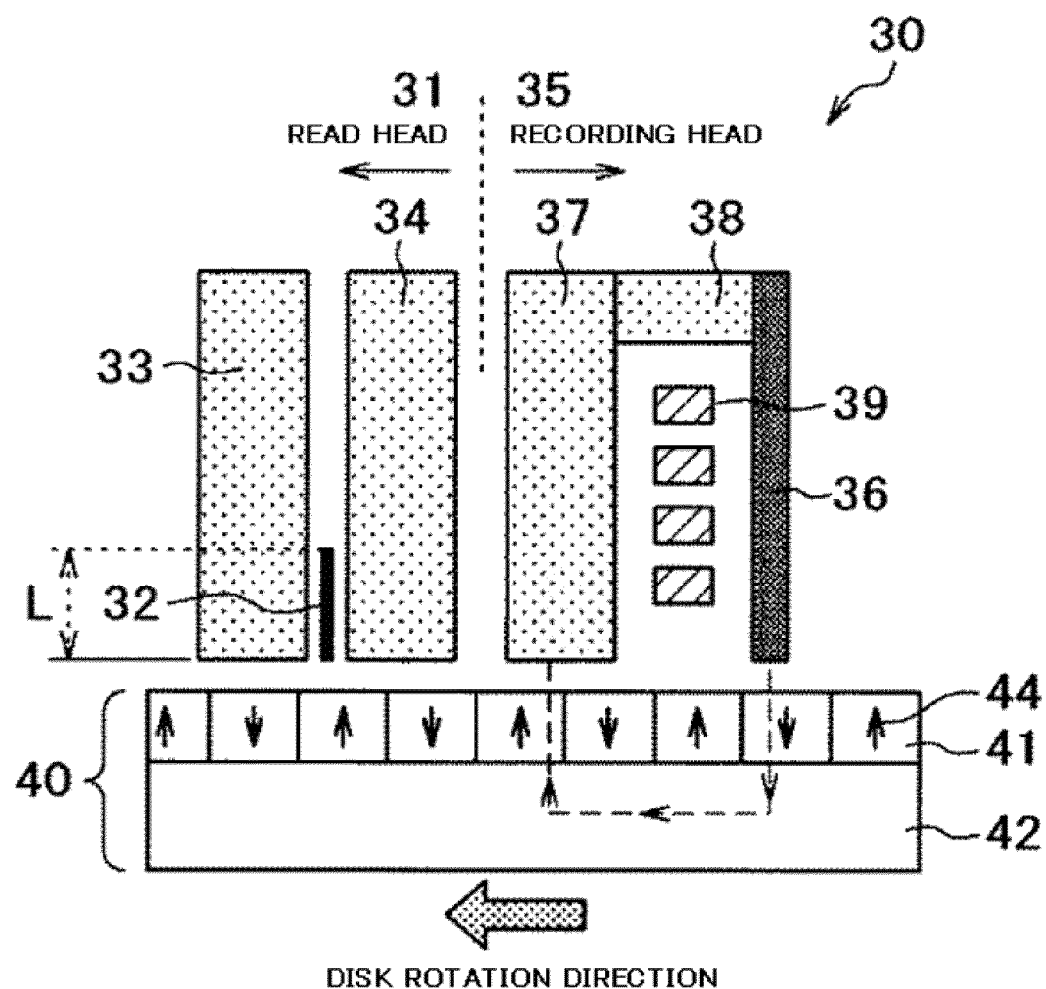
FIG. 2 is a view showing a configurational and an operational concept of a perpendicular magnetic recording head according to one embodiment.

FIG. 2 shows a configurational and an operational concept of a perpendicular magnetic recording head according to one embodiment. As shown in FIG. 2, a perpendicular magnetic recording head 30 has a magnetic head element portion (head element portion) 3' including a read head 31 and a write head 35 stacked on an element formation surface of a slider 3 (refer to FIGS. 5-8). The read head 31 is configured by interposing a read element 32, such as a GMR element or a TMR element, between a lower magnetic shield 33 and an upper magnetic shield 34. The write head 35 is configured by a write element (main pole) 36, a return pole 37, a rear pole 38, and a conductor coil 39. Perpendicular magnetic recording is regarded as a magnetic recording technology where a magnetic field is applied to a recording layer 41 interposed between a soft-magnetic underlayer 42 of a two-layer recording medium 40 and the main pole 36, so that a magnetic material in the recording layer 41 is magnetized 44 in a direction perpendicular to a disk surface, thereby recording information.

Figure 3:
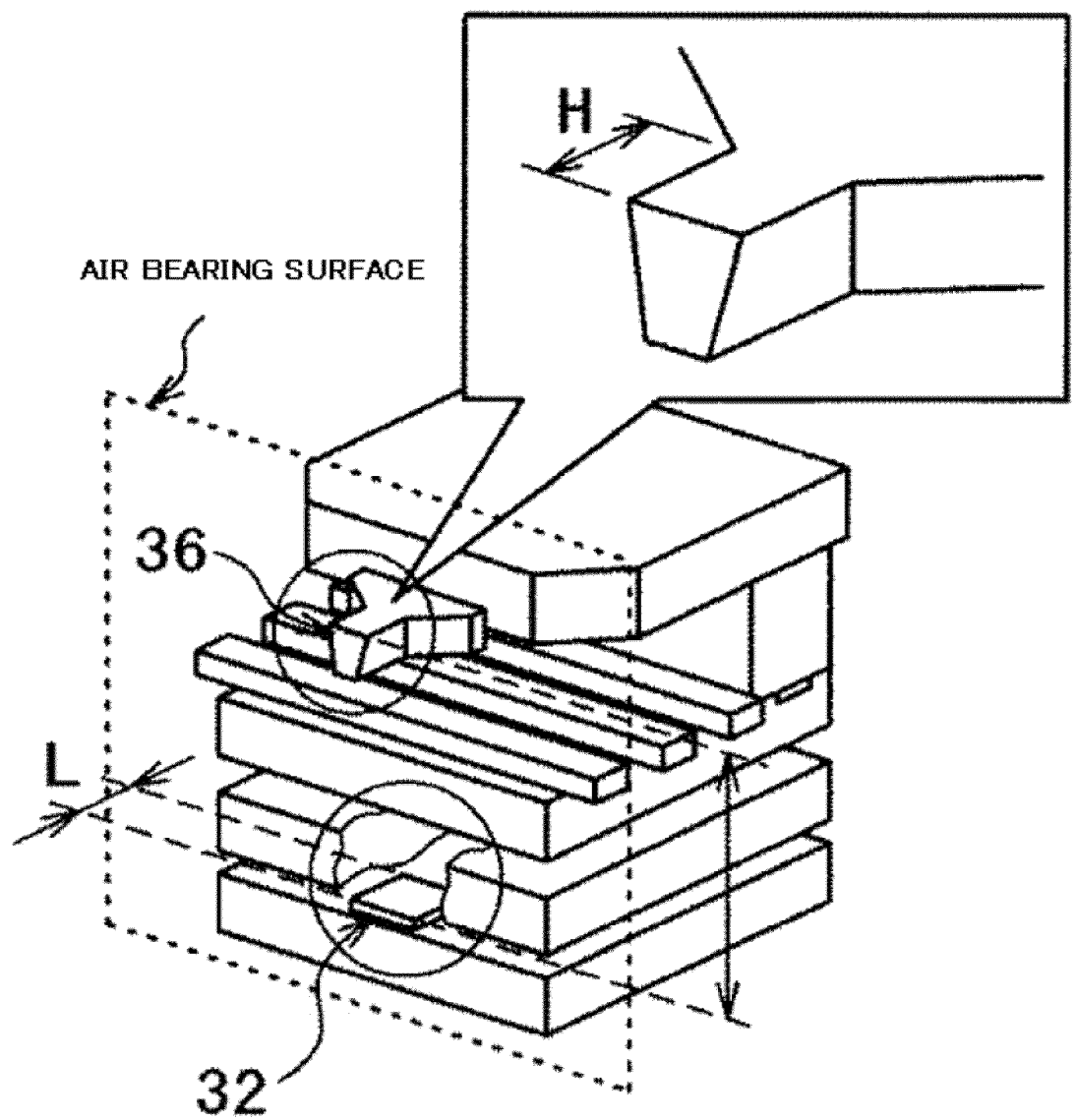
FIG. 3 is a configuration view of an element portion of the perpendicular magnetic recording head according to one embodiment.
Figure 4:
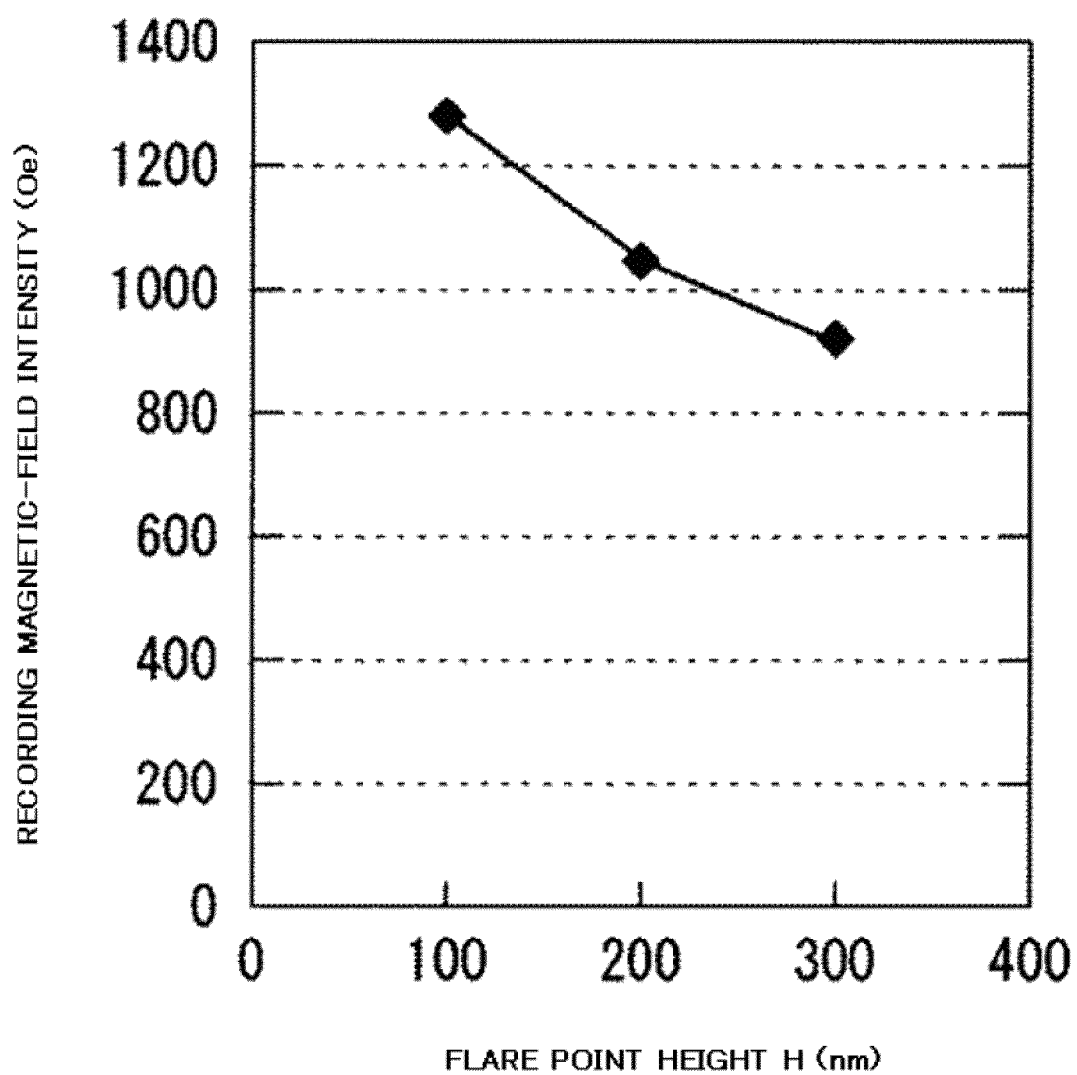
FIG. 4 is a diagram showing a relationship between a recording magnetic-field intensity of the perpendicular magnetic recording head and a flare point height of a write element according to one embodiment.

FIG. 3 shows a schematic configuration of the head element portion 3' in one embodiment. A point where a portion (flare) of the main pole 36 has a fan shape that is continued to a parallel body of the main pole is called the flare point (FP). Height H from a head air bearing surface to the flare point is called the flare point height. As shown in a relationship diagram between recording magnetic field intensity and flare point height H in FIG. 4, reducing the flare point height H results in a large recording magnetic field. However, when such a height dimension is too small, write blurring may occur during recording, and when the dimension is too large, the recorded signal may be erased due to residual magnetization. Therefore, extremely high accuracy is used in determining that dimension. On the other hand, height L of a read element 32 also has a high dimension accuracy, similar to that in the conventional longitudinal recording technology.

Next, according to one approach, basic steps of a manufacturing process of a head slider are described with reference to FIG. 5. First, a large number of head element portions are formed in a reticular pattern on a wafer 1 by a process, such as a semiconductor photolithography process. An air bearing surface of a head slider 10' is formed as a section of each of the wafer 1 and the head element portion 3'. To define an element's dimension, flatness, and smoothness of an air bearing surface by the lapping process in an efficient process (301), the head slider 10' is temporarily cut out from the wafer in a bar-shaped form of a half-finished product 2, including several tens of head sliders 10' connected to one another, called a row bar.

Next, according to one approach, the row bar 2 is mounted on a row-bar tilting mechanism 5, and an air bearing surface of the head slider 10' is formed by a lapping process in a state of the row bar 2. The lapping process step is further divided into two steps: a rough lapping (302) as a first step where a material near the air bearing surface is removed by a thickness of about several micrometers with abrasive grains having a relatively large grain size so that a height dimension of each of the read elements and a dimension of the flare point height of a main pole are roughly aligned to one another, and a subsequent fine lapping process (303) as a second step where the material of the air bearing surface is further removed by a thickness of about several nanometers with abrasive grains having a relatively small grain size so that flatness and smoothness of the air bearing surface of the slider are adjusted to be within a specification, and the height dimension of each of the read elements and the dimension of the flare point height of the main pole are precisely aligned to each other.

The lapping step, according to one embodiment, is performed in such a way that displacement between the read head and the write head, the displacement occurring in the step of forming each head element on the wafer, is corrected by adjusting removing amount of the material of each of the read head and the write head by tilting a lapping surface in the rough lapping step (302), so that dimensions of both elements are accurately finished together at the end of lapping. In the step, since amount of the material removed in the fine lapping process step (303) as the latter step is extremely small, only about several nanometers, the amount of displacement being correctable during the step is 1 nm or less, which is substantially uncorrectable. Therefore, correction of the element dimension by tilting the surface to be lapped is mainly performed in the rough lapping process step (302).

The displacement between the height dimension of each read element and the dimension of the flare point height of the main pole is corrected through the rough lapping process, and variation in dimension in the row bar is reduced as much as possible. Then, the row bar 2 is adjusted in flatness and smoothness by adjusting dimensions of each of the read and write heads through the fine lapping process, and then the row bar 2 is passed to an air bearing surface grooving step (304 and 305).

In the air bearing surface grooving step (304 and 305), the row bar 2 is mounted on an air bearing surface grooving tool 6, and first a protective overcoat thin film of high-hardness material, such as diamond-like carbon, is formed on the air bearing surface of the slider for protecting the head element portion. Then a groove shape is formed on the air bearing surface of the slider by photolithography and etching steps for stabilizing a flying state of the slider during operation of a magnetic storage disk drive.

The head sliders 10', each having a groove shape formed on the air bearing surface in the air bearing surface grooving step, are finally cut into individual head sliders from the row bar 2 (306), and completed as product head sliders 10.

Figure 5:
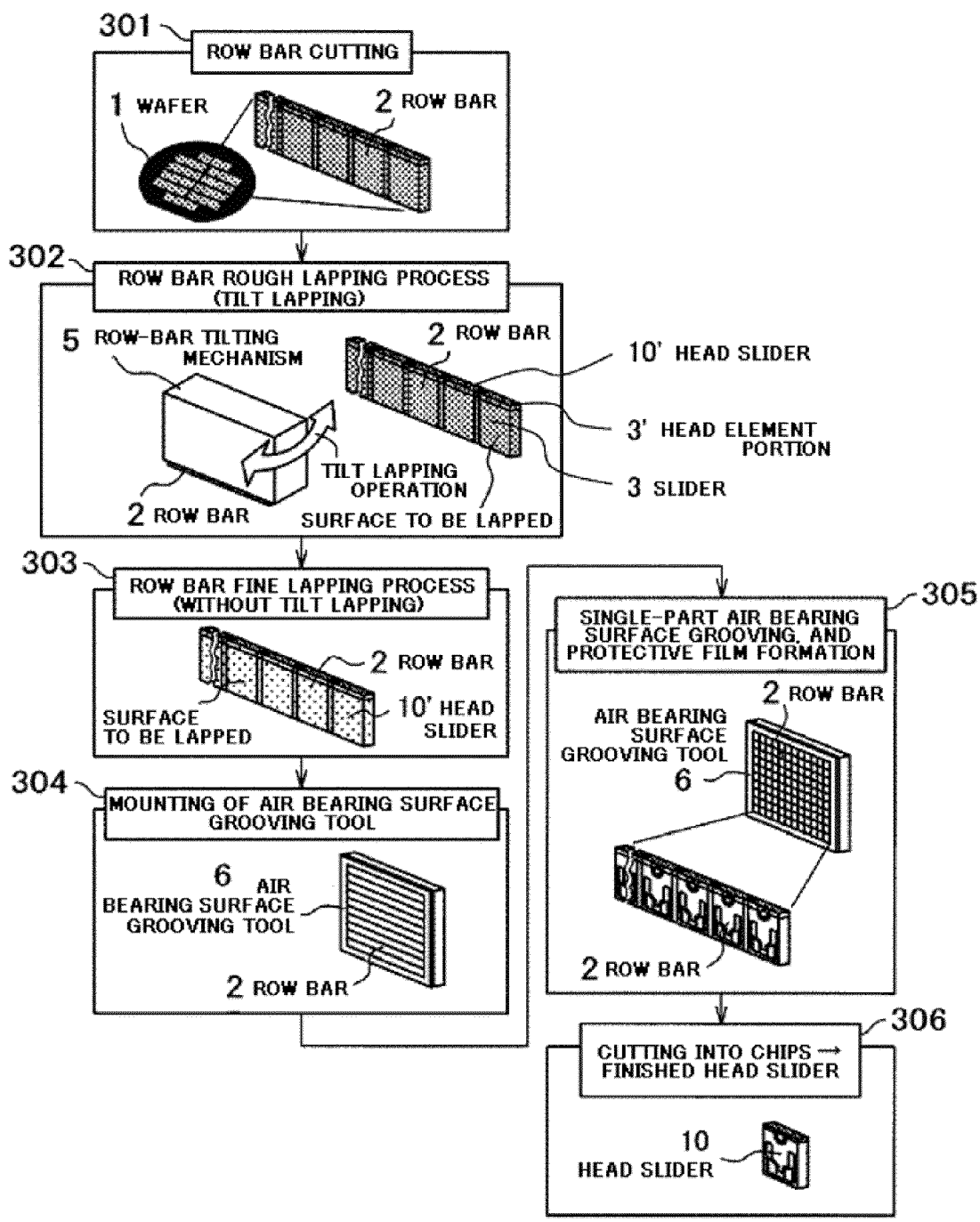
FIG. 5 is a diagram showing a head slider fabrication process using one embodiment, including tilt lapping with rough lapping and fine lapping processes on a row bar.
Figure 6:
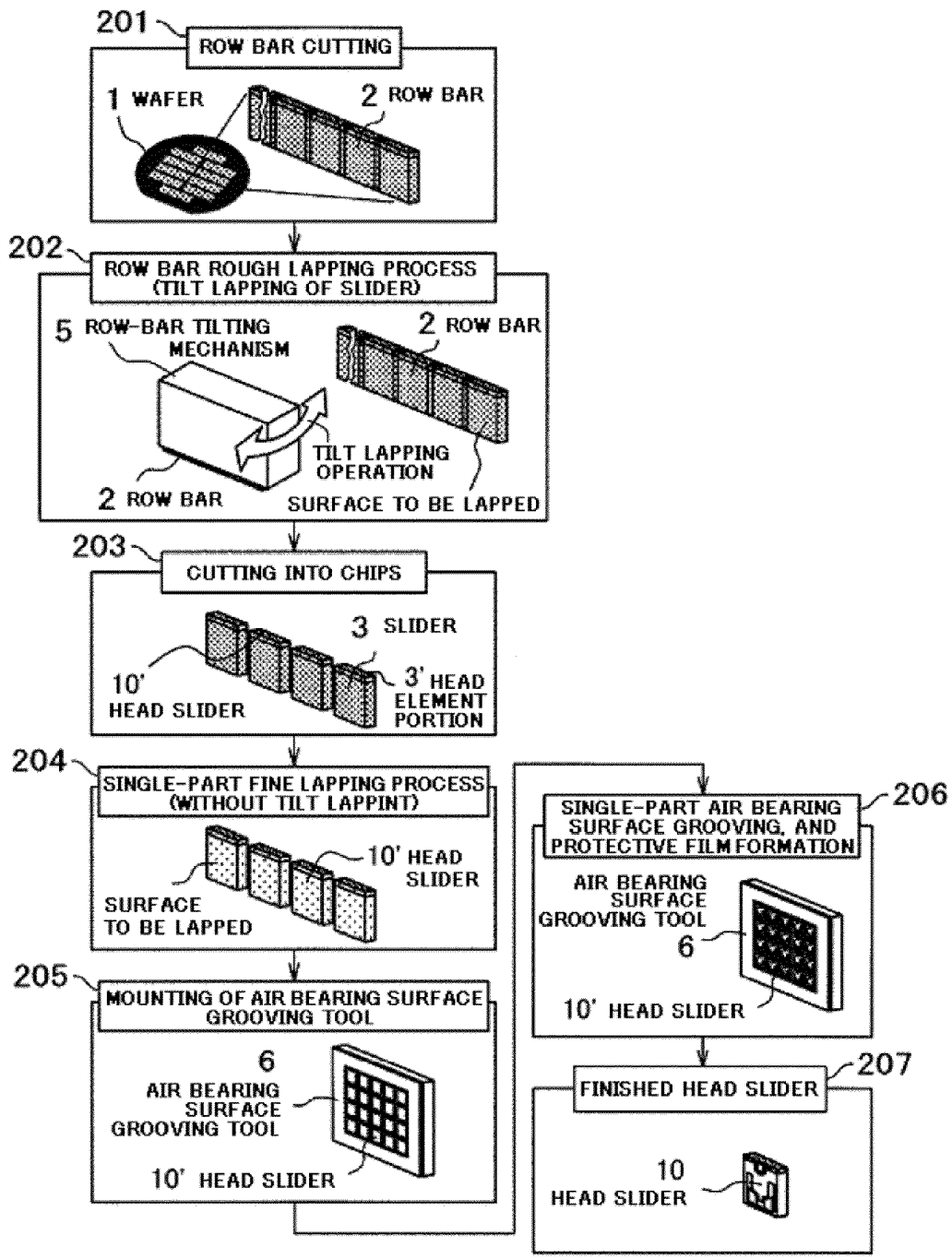
FIG. 6 is a diagram showing a head slider fabrication process using an embodiment, including tilt lapping of a row bar and a fine lapping process of a single-part head slider according to one embodiment.
Figure 7:
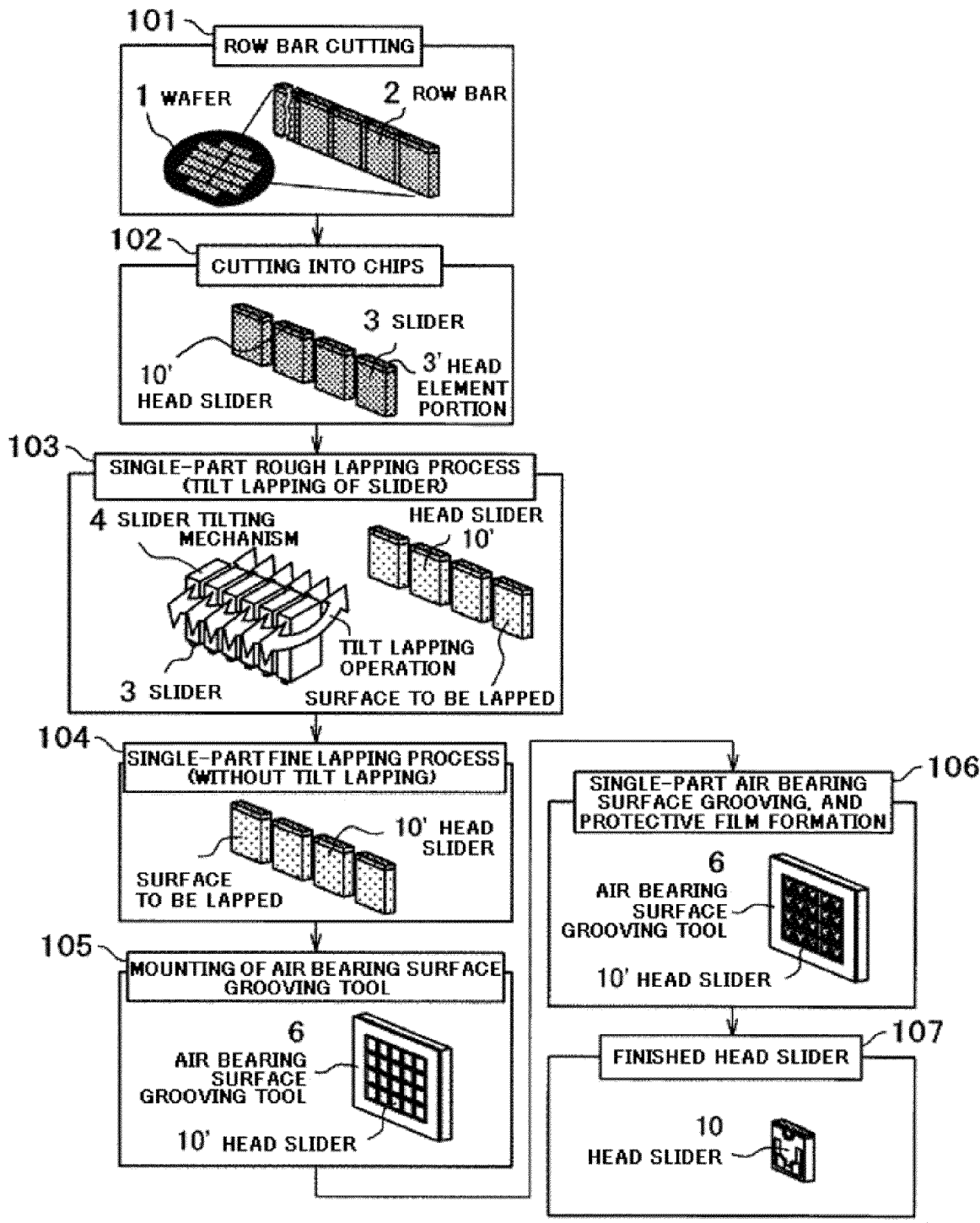
FIG. 7 is a diagram showing a head slider fabrication process, including tilt lapping of a single-part head slider at rough lapping and a fine lapping process of the single-part head slider according to one embodiment.

In the steps as shown in FIG. 5 according to one embodiment, the tilt lapping is performed in the row bar state, and the fine lapping process is also performed in the row bar state. However, as shown in FIG. 6 according to another embodiment, it is acceptable that a tilt lapping step (202) is performed in the row bar state, and a fine lapping process step (204) is performed in a single-part head slider state. Alternatively, as shown in FIG. 7 according to yet another embodiment, it is acceptable that a slider tilting mechanism 4 is used so that a tilt lapping step (103) is performed in a single-part head slider state, and a fine lapping process step (104) is also performed in a single-part head slider state.

The write head 35 of the perpendicular magnetic recording head 30 is not structured in such a way that electrical current flows into the head portion that has a high dimensional accuracy, namely, a head portion formed to be the flare point height H of the main pole 36. Therefore, a method may not be used for the write head, like it can be for the read head 31, where a resistance value of an element is measured while electrical current is flowing into the element, and a dimension of the element is estimated from the resistance value. Therefore, typically, the quality of the write head cannot be determined until a later stage of the slider manufacturing process; that is, until a magnetic characteristic is measured in an inspection step where a magnetic head slider is mounted on a suspension, and a signal is actually recorded and reproduced into/from a magnetic recording medium.

These descriptions of a configurational and an operational concept of a perpendicular magnetic recording head, and the descriptions of the basic steps of a head slider manufacturing process can be taken into consideration in the latter descriptions of a method of manufacturing a perpendicular magnetic recording head including a step of estimating flare point height of a main pole, which is a feature of the invention in one embodiment.

Figure 8:
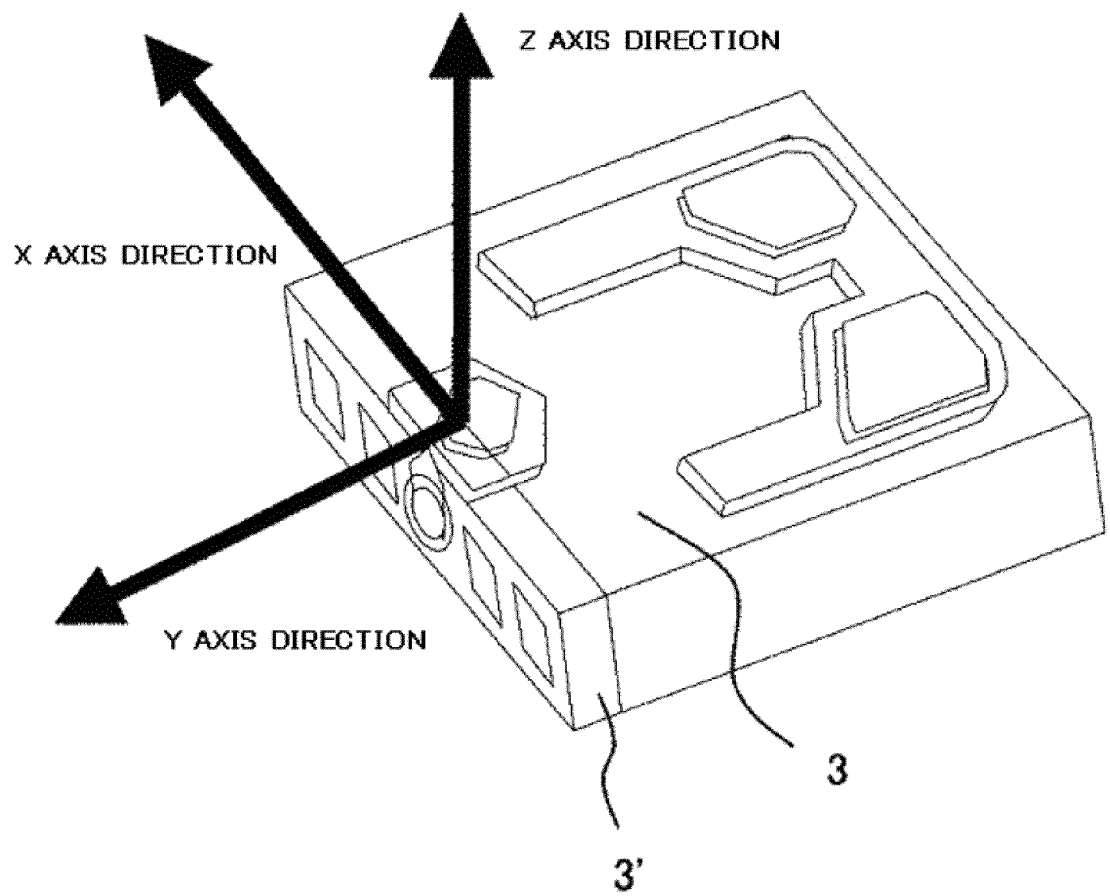
FIG. 8 is a schematic view showing directions of rectangular coordinate axes of a perpendicular magnetic recording head according to one embodiment.

First, as shown in FIG. 8 according to one approach, an X axis, a Y axis, and a Z axis being perpendicular to one another, are defined in a perpendicular magnetic recording head. The Z axis is along a normal direction to an air bearing surface of a slider, the Y axis is along a direction along a track of a magnetic recording medium (down track direction), and the X axis is along a direction perpendicular to the track of the magnetic recording medium (cross-track direction).

Figure 9:
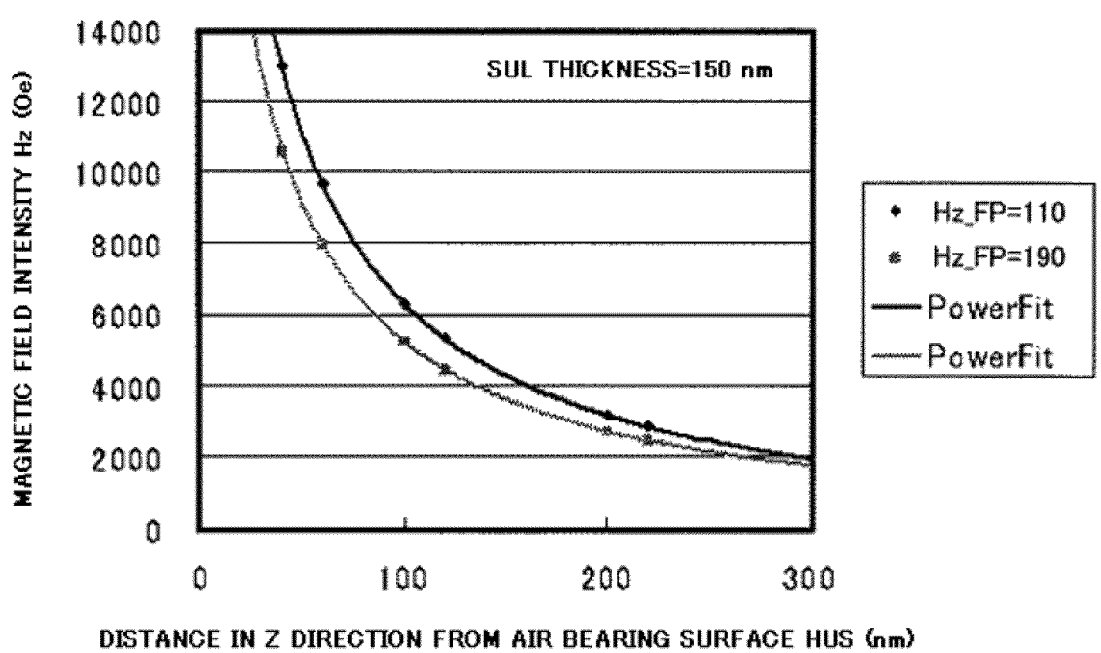
FIG. 9 is a diagram showing changes in a magnetic field intensity near a main pole with respect to a distance in a Z direction (normal direction to an air bearing surface) from an air bearing surface for each of two kinds of samples having different flare point heights according to one embodiment.

FIG. 9 shows a result of calculating, by simulation, the change in recording magnetic-field intensity generated from main poles having different flare point heights with respect to displacement in a Z direction from a center of each main pole on an air bearing surface (a point at which distribution in an XY plane of magnetic field intensity is at its maximum), according to one approach. In the calculation, a magnetic film simulating a soft-magnetic underlayer (SUL) of a perpendicular magnetic recording medium is allowed to face the main pole, and when the magnetic film is gradually moved away from the air bearing surface, magnetic field intensity is calculated at a distance (HUS) to an intersection with a magnetic film surface of a perpendicular line dropped from a center of a male pole to the magnetic film surface. The magnetic field intensity is reduced almost exponentially with respect to the distance from the air bearing surface depending on a condition of each flare point height. However, at the same distance from the air bearing surface, the magnetic field intensity is higher in shorter flare point heights as described in FIG. 4.

In this way, when flare point height is different, magnetic field intensity and an attenuation rate thereof (a gradient) are accordingly different, as determined in one approach. With any type of magnetic field intensity sensor, a distance from the air bearing surface of a magnetic head to the sensor is extremely hard to accurately measure in nanometer scale. Therefore, flare point height cannot be estimated from a value obtained only by measuring an absolute value of magnetic field intensity at a point, because the value is influenced by both a factor of the distance from the air bearing surface, and a factor of a difference in flare point height. However, if a distance of the magnetic field sensor from the air bearing surface may be separately prepared, for example with an optical measurement device, the flare point height may be estimated, but the cost will be undesirably increased.

Figure 10:
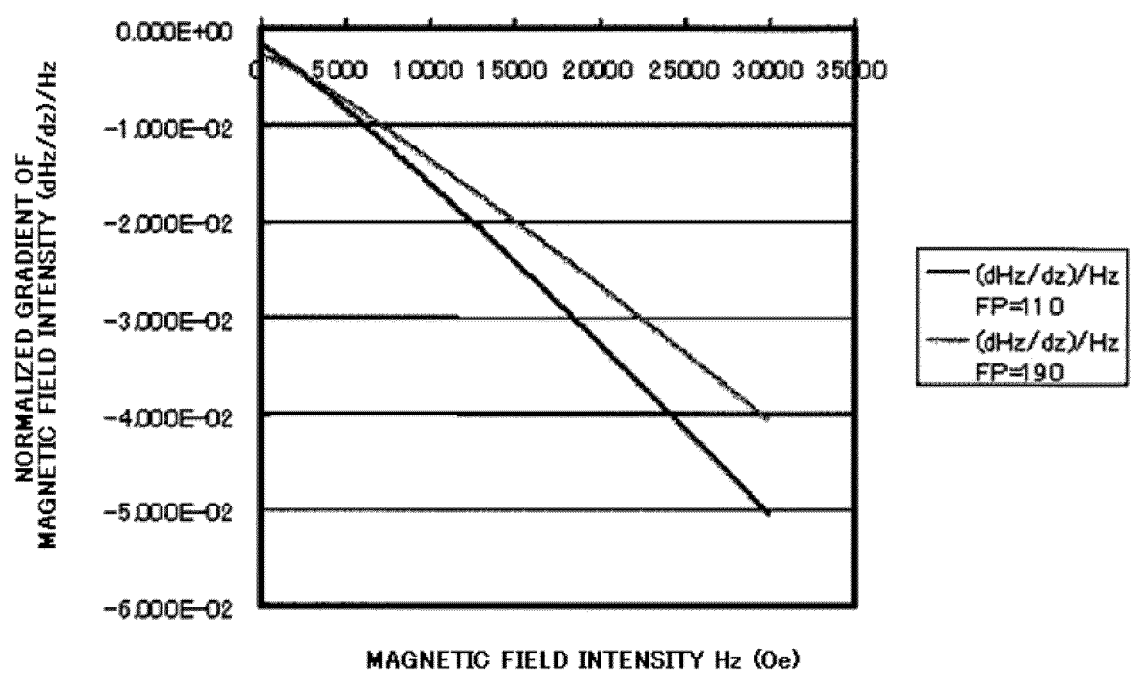
FIG. 10 is a diagram showing changes of a magnetic field intensity gradient near a main pole to a distance in a Z direction from an air bearing surface with respect to a magnitude of the magnetic field intensity, the gradient being normalized with the magnetic field intensity itself, for each of two kinds of samples having different flare point heights according to one embodiment.

FIG. 10 shows an attenuation rate (a gradient) of the magnetic field intensity to a distance from the air bearing surface according to one embodiment, the attenuation rate being normalized with the magnetic field intensity itself, and plotted with respect to the magnetic field intensity. As is clear from the figure, when a measurement point is gradually moved away from the air bearing surface, if the flare point height is different, a gradient of magnetic field intensity is accordingly different. Therefore, the flare point height may be estimated based on the gradient of the magnetic intensity at a certain distance from the air bearing surface.

Figure 11:
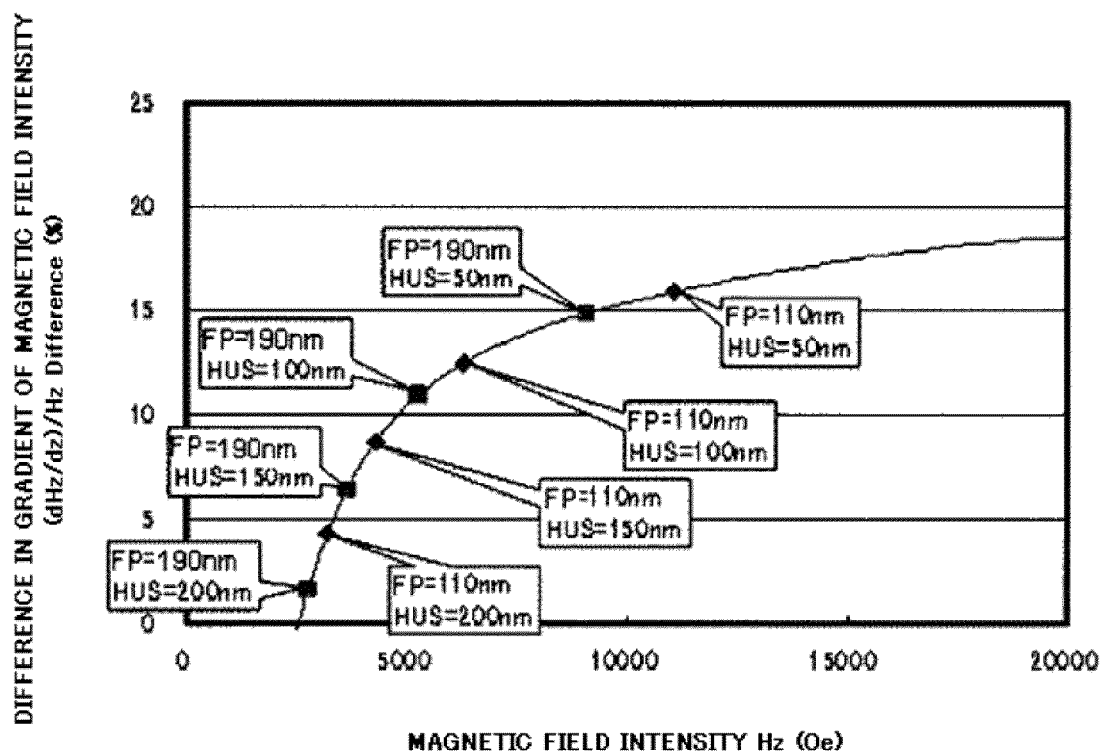
FIG. 11 is a diagram showing, for each of two kinds of samples having different flare point heights, changes in a difference between the two samples in gradient of magnetic field intensity near a main pole to a distance in a Z direction from an air bearing surface, the gradient being normalized with the magnetic field intensity itself, with respect to magnitude of the magnetic field intensity according to one embodiment.

FIG. 11 shows these differences in a gradient according to one embodiment, which is plotted with respect to magnetic field intensity for further ease in understanding. This plot shows that when a measured magnetic field strength has a particular value, a difference in the flare point height is reflected by a difference in the gradient. When a measurement point is chosen, for example, at a distance of about 50 nm from the air bearing surface, a magnetic field intensity has a value of approximately 10,000 Oe for each flare point height having each value as read from FIG. 9. Since an absolute value of a distance from the air bearing surface is unknown, the flare point height cannot be estimated from the information.

However, even if an absolute distance is unknown, a relative distance from a reference distance can be accurately controlled, down to the nanometer, by using an actuator that employs a piezoelectric element or the like, in one approach. In this manner, a reference distance may be temporarily determined to be a distance at which a value of a magnetic-field intensity sensor reads 10,000 Oe, and the gradient may be measured while a measurement point is vertically moved from the reference point along a Z-axis direction. Such an operation is performed to each of the magnetic head slider samples having different flare point heights, resulting in a magnetic-field intensity gradient of one example that is about 15% higher than a magnetic-field intensity gradient of the other sample as shown in FIG. 11, as an example.

This means that a magnetic-field intensity gradient near a reference magnetic-field intensity gradient is uniquely determined with respect to the reference magnetic-field intensity for a flare point height of each sample, according to one approach. Therefore, samples having various flare point heights are prepared, and a magnetic-field intensity gradient to a distance from the air bearing surface of each sample is measured, then the flare point height of each sample is accurately measured using a destructive measurement method such as FIB or etching, and a relationship between the flare point height and a magnetic-field intensity gradient is prepared and stored, such as in a database. Thereafter, a magnetic-field intensity gradient of a subsequently prepared magnetic head sample is measured, so that the flare point height of the additional sample can be nondestructively estimated with reference to the stored value.

Figure 12:
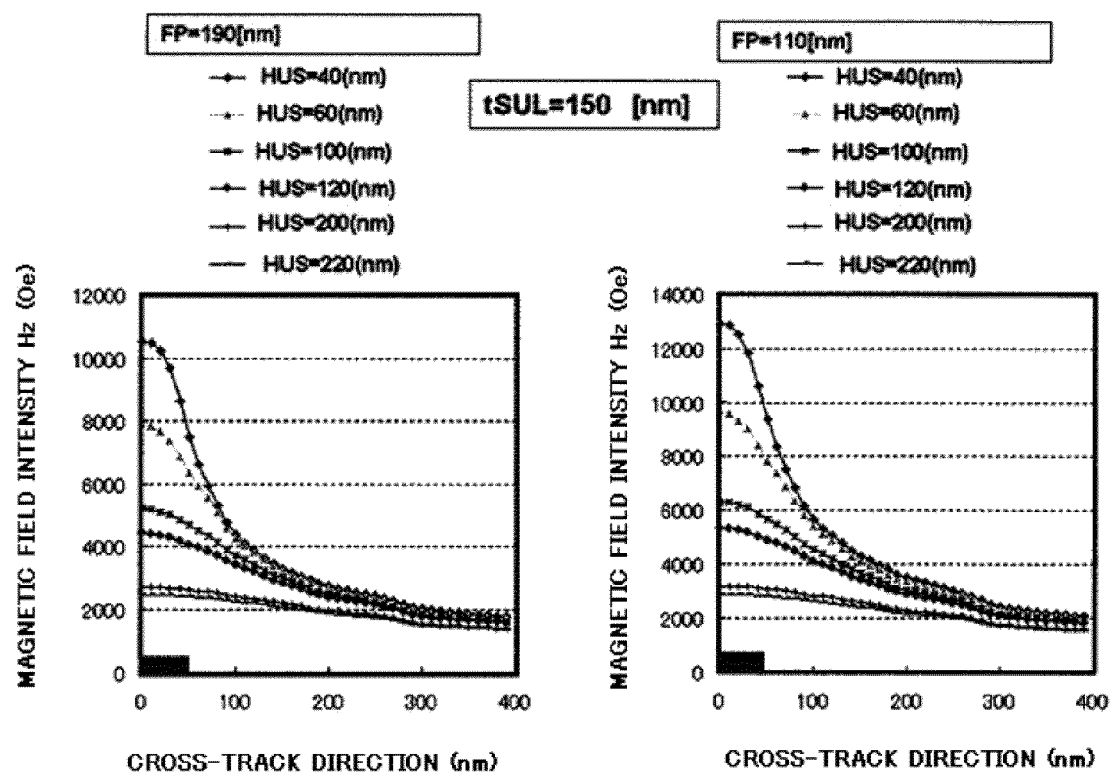
FIG. 12 is a pair of diagrams showing changes in magnetic field intensity in a cross-track direction (X direction) as a distance in a Z direction is gradually changed for each of two kinds of samples having different flare point heights according to one embodiment.
Figure 13:
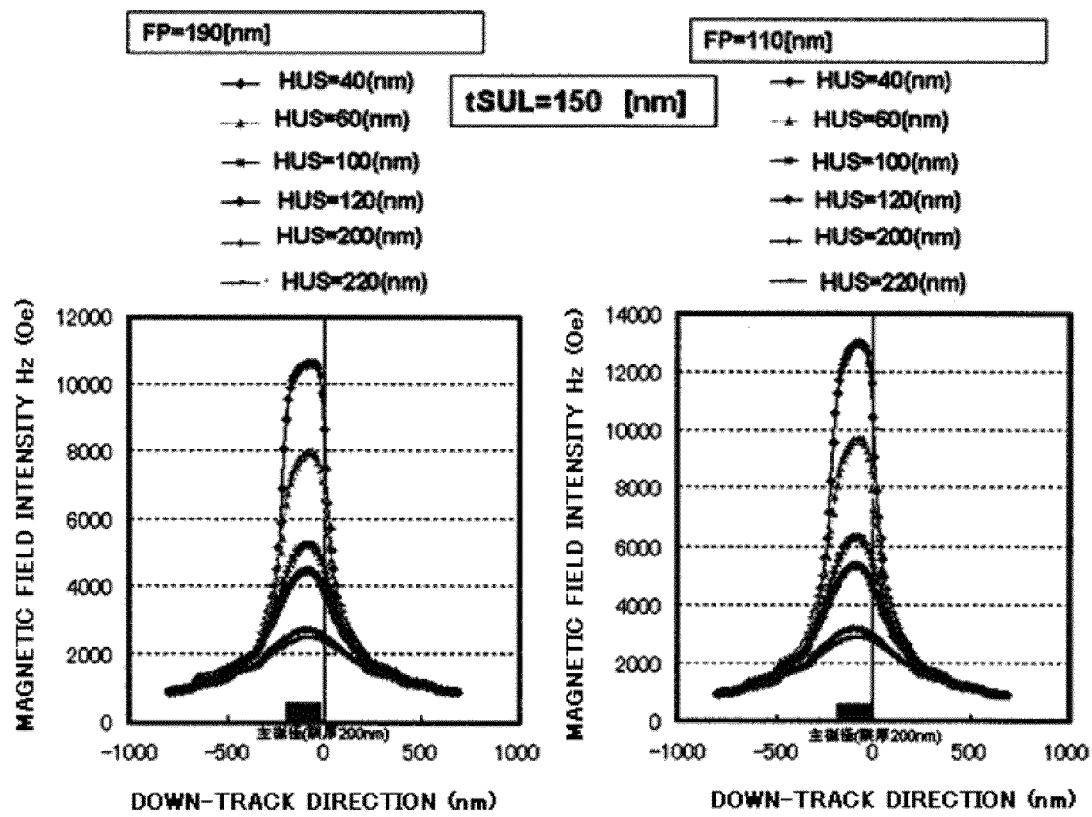
FIG. 13 is a pair of diagrams showing changes in magnetic field intensity in the down-track direction (Y direction) as a distance in a Z direction is gradually changed for each of two kinds of samples having different flare point heights according to one embodiment.

In some embodiments, the above measurement is made assuming that a point at which magnetic field intensity is at its maximum in an XY plane is a start point, and a measurement point is gradually moved away from a region near the air bearing surface in a Z direction. The maximum point of magnetic field intensity, in one approach, is determined as follows: first, a measurement point is raster-scanned in an X or Y direction in a region close to the air bearing surface, then a point at which a measurement value is at its maximum is determined as the maximum point. As a reference, FIGS. 12 and 13 show the change in magnetic field intensity as the measurement point is scanned in an X direction (cross-track direction) and a Y direction (down track direction) through the maximum point of magnetic field intensity respectively, the change being plotted while a distance Z from the air bearing surface is gradually changed, both for a case where flare point height is high (FP=190 nm), and a case where the flare point height is low (FP=110 nm).

The results of these calculations and estimations are summarized as follows: flare point height of the main pole of the perpendicular magnetic recording head is estimated according to the following procedure, in one approach.

(1) A magnetic intensity sensor is set extremely close to an air bearing surface, and a measurement point is raster-scanned in an X or Y direction, so that a point at which a measurement value is at its maximum is determined and assumed as the center of the main pole.

(2) The measurement point is gradually moved from the center point along the Z direction, and positioned such that a measurement value of magnetic field intensity is similar to a reference value.

(3) The measurement point is moved by plus or minus, about several tens of nanometers, in the Z direction with the position determined as described above as a center, and an attenuation rate (a gradient) of the measurement value of the magnetic field intensity to displacement in the Z direction of the measurement point is calculated, and the calculated attenuation rate is normalized with the measurement value, and plotted with respect to the measurement value itself.

(4) The gradient is compared to a gradient in a database of samples being separately prepared, each sample having known flare point height, thereby flare point height of the sample is estimated from a normalized value of the gradient.

Next, a method of estimating a main pole dimension according to one approach, and application of the method to a manufacturing process of a head slider are described. While a magnetic-field intensity sensor (magnetic field sensor) may include various types, such as an induction coil type, a Hall effect element type, and a magneto-resistive element (AMR, GMR, TMR or the like) type, the outcome is not influenced by the method. Thus, as an example, and not limiting in any way, a magneto-resistive element mounted on a head slider as a read element is used as a magnetic field sensor, and is described below.

The magneto-resistive element changes its electrical resistance depending on an external magnetic field, and since the element itself has a finite volume (several tens of nanometers in width, several tens of nanometers in height, and several nanometers in thickness, according to several approaches), information of a resistance value obtained by the measurement corresponding to the recording magnetic fields is integrated over the size of the magneto-resistive element for the distribution of a recording magnetic field itself generated by inputting an electrical signal into a write head. However, in view of one of the objectives of the invention, according to some embodiments, namely, for estimation of a main pole dimension, it is supposed that a dimension of an objective sample is estimated through comparison with a dimension in a separately prepared database of samples having known flare point height, and measurement may be performed using a magneto-resistive element having a finite volume.

Figure 14:
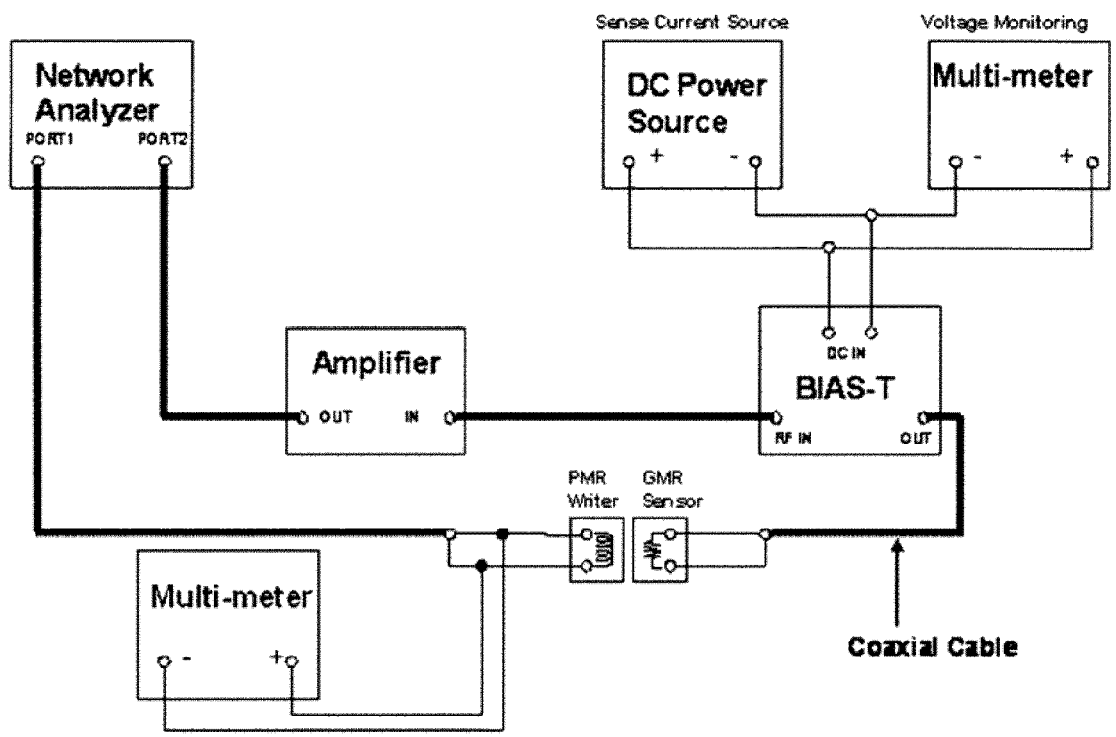
FIG. 14 is a schematic diagram showing an example of an apparatus configuration for carrying out a method of estimating a main pole dimension according to an example.

FIG. 14 shows a block diagram of an apparatus used for an experiment, according to one embodiment. To be used as a magneto-resistive element in a measurement sensor, a magnetic head slider for a magnetic disk storage device is mounted on a suspension, and used in a manner that a terminal portion of a magnetic head is ball-bonded to a terminal of a flexible cable disposed on the suspension. Similarly, a magnetic head slider having a write head to be examined is mounted on the suspension, and used in a manner that a terminal portion of a magnetic head is ball-bonded to a terminal of a flexible cable disposed on the suspension. These are used for facilitating a simple experiment using soldering or the like. In a measurement apparatus used for an actual magnetic head slider manufacturing process, a magnetic head slider is directly clamped, and connected to a signal line of a measurement system through a terminal portion being contacted to the signal line. FIG. 1 shows a schematic view of a layout of the magnetic head slider having the write head to be examined, and the magnetic head slider having the magneto-resistive element as a magnetic field sensor.

Measurement is performed through the following operation according to one embodiment: the objective recording head (PMR Writer) is energized with a sinusoidal high-frequency electric signal having a constant effective voltage, and the magneto-resistive element (GMR sensor) disposed near a main pole of the write head is monitored for output voltage signal to record an amplitude ratio of an output voltage to an input signal and a difference in phase between the output voltage and the input signal, the output voltage being generated as a sinusoidal high-frequency voltage having the same frequency as that of the input sinusoidal high-frequency signal. The magneto-resistive element measures resistance change of the element depending on an external magnetic field as a voltage induced between both ends of the element while a sense current being a constant current is flowed into the element.

Therefore, when the magneto-resistive element being a magnetic-field intensity sensor is slightly displaced in a three dimensional manner with respect to the write head to be examined, change in output from the magneto-resistive element corresponds to a distribution of magnetic field intensity near the write head on the premise that the element has a finite volume as described heretofore.

In the example, the three-dimensional, slight displacement of the magnetic-field intensity sensor may be controlled using a tri-axial piezoelectric stage that can be positioned with a resolution of 1.0 nm in X, Y and Z directions. Any type of actuators, stages, and the like, may be used, if it can be accurately positioned with a resolution of 1.0 nm or less in such a manner.

In the perpendicular magnetic recording head 30, as shown in FIG. 2, since a magnetic circuit is formed including the main pole 36, the medium recording layer 41, the medium soft-magnetic underlayer 42, the medium recording layer 41, the return pole 37, and the rear pole 38, a magnetic field direction in a region near the main pole is opposite to a magnetic field direction in a region near the return pole. Therefore, to facilitate detection of a center of the main pole near the main pole, a relative phase of output signal to input signal is concurrently measured in addition to the output ratio. This is because when respective magnet fields have opposite directions, and a phase of an output signal is also shifted by 180 degrees, magnetic field distribution near the main pole is easily distinguished from magnetic field distribution near the return pole.

Measurement of an amplitude ratio between the sinusoidal high-frequency signal having a constant effective voltage may be performed using a network analyzer according to one embodiment that may concurrently measure the amplitude ratio and the phase difference. The signal may be applied to the write head (PMR Writer) to be examined, and the voltage output signal from the magneto-resistive element (GMR Sensor) may be a magnetic-field intensity sensor disposed near the main pole. Also, the signal may be measured while a constant current is flowed into the magneto-resistive element, and a measurement of the phase difference between them may be taken also.

While the sinusoidal high-frequency signal having a constant effective voltage may be applied to the write head (PMR Writer) to be examined from one port (PORT1) of the network analyzer according to one approach, a constant current may be applied to the magneto-resistive element (GMR Sensor), which may be a magnetic-field intensity sensor from a constant-current power supply via a BIAS-T for separating a DC signal from an RF signal.

As a magneto-resistive element displaced near a write head is slightly displaced, an intensity gradient of an output sinusoidal high-frequency signal may be monitored by the magneto-resistive element, according to one approach, which may be loaded through the other port (PORT2) of the network analyzer via the BIAS-T and an amplifier. Then, comparison of amplitude between signals through the respective ports, and comparison of a phase between the signals may be subjected to data processing while being coupled with positional information of the piezoelectric stage, thereby mapping information of the three-dimensional data may be obtained.

Figure 15:
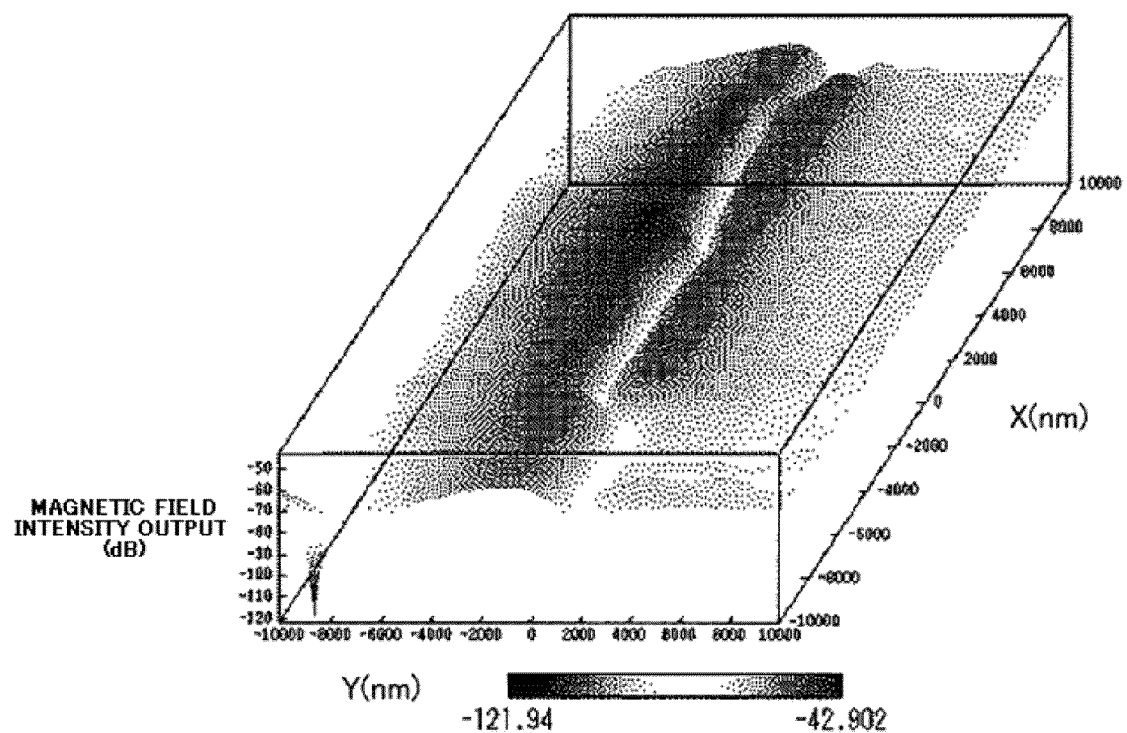
FIG. 15 is a diagram showing sensor output corresponding to magnetic-field intensity as a magnetic-field intensity sensor is raster-scanned in an XY direction with a Z-directional position of the magnetic-field intensity sensor being fixed in an estimation step of a main pole dimension according to an example.

FIG. 15 shows an example of a two-dimensional distribution of a magnetic-field intensity output obtained by raster-scanning the magneto-resistive element, in one embodiment, which is opposed to the write head to be examined near the write head. The write head is in an XY plane with displacement in a Z direction being fixed while both the elements are substantially in contact with each other. A shown area extends over 20 μm in each of X and Y directions with a portion near the element as a center, and an interval between data points is 400 nm in each of X and Y directions, according to one embodiment. The peak observed in the left-side of the figure corresponds to magnetic-field intensity output distribution around a main pole, and the rectangular peak in the right-side of the figure corresponds to magnetic-field intensity output distribution around a return pole. In the figure, only a simple ratio (dB) of input into the write head to output from the magneto-resistive element is plotted, which simply reflects distribution of absolute values of intensity. Therefore, both the distribution around the main pole and the distribution around the return pole appears as a convex upward distribution, according to one embodiment.

Figure 16:
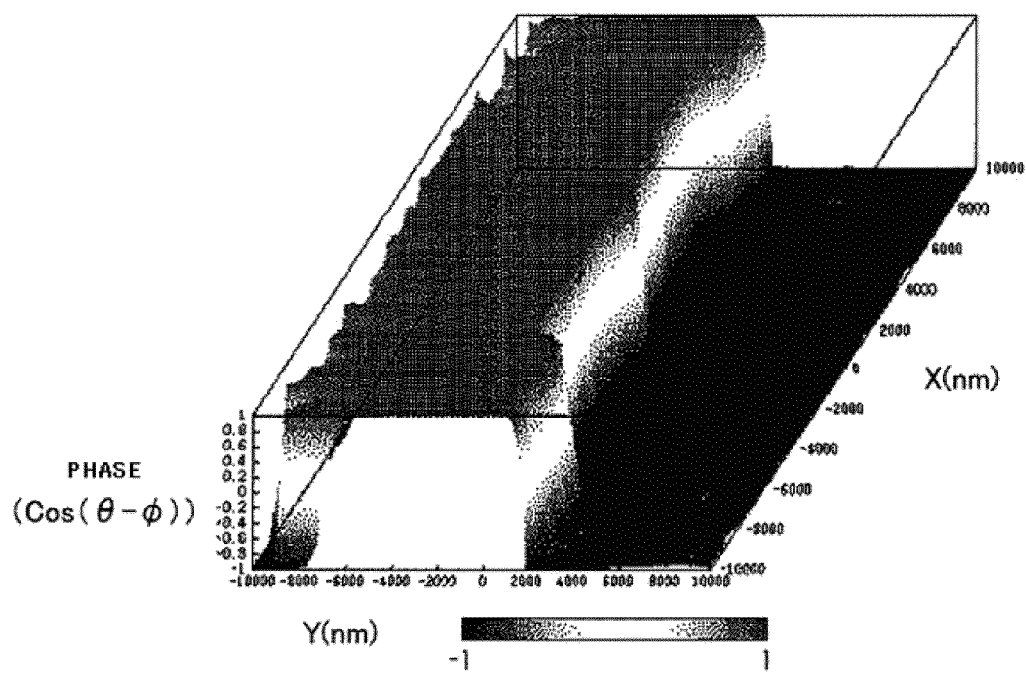
FIG. 16 is a diagram showing phase difference between sensor output corresponding to magnetic-field intensity and an input signal as a magnetic-field intensity sensor is raster-scanned in an XY direction with a Z-directional position of the magnetic-field intensity sensor being fixed in an estimation step of a main pole dimension according to an example.

Thus, to additionally take a direction of a magnetic field into consideration, phase data is acquired within the same XY area, as shown in FIG. 16. Values in FIG. 16 are adjusted for phase delay uniformly occurring in a measurement circuit to calibrate such that a phase of a magnetic field on a main pole side is at zero degrees, and accordingly a phase of a magnetic field in a return pole side is at 180 degrees, according to one approach. A cosine value of each of the phase angles is multiplied by the intensity distribution of FIG. 15, and furthermore a vertical axis is converted in scale from dB to linear, leading to distribution corresponding to the magnetic-field intensity output distribution around each of the main pole and the return pole while taking a magnetic field direction into consideration. However, since the magnetic field sensor providing a measurement value has a finite volume, the observed distribution actually corresponds to the actual magnetic field distribution integrated over an area of size of the magnetic field sensor or the magneto-resistive element, as described herein.

Figure 17:
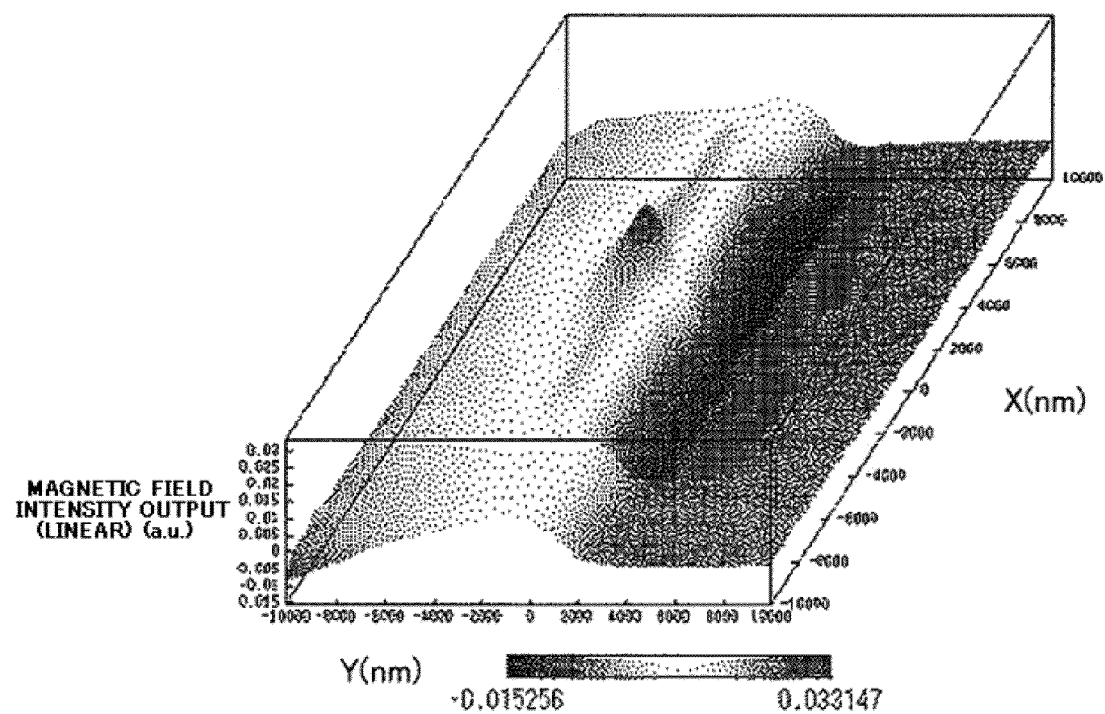
FIG. 17 is a diagram showing a state where a direction of a magnetic field is taken into consideration by multiplying sensor output corresponding to magnetic-field intensity by a cosine value of phase difference with respect to an input signal as a magnetic-field intensity sensor is raster-scanned in an XY direction with a Z-directional position of the magnetic-field intensity sensor being fixed in an estimation step of a main pole dimension according to an example.

FIG. 17 shows distribution of values obtained by multiplying the magnetic-field intensity output distribution of FIG. 15 by the cosine values of phases of FIG. 16, and converting the scale of the vertical axis from dB to linear, according to one approach. As in FIG. 15, the upward convex peak observed in the left-side of the figure corresponds to the magnetic-field intensity output distribution around a main pole, and the rectangular downward concave peak in the right-side of the figure corresponds to magnetic-field intensity output distribution around a return pole. As previously described, in the perpendicular magnetic recording head, as shown in FIG. 2, since a magnetic circuit is formed including the main pole, the medium recording layer, the medium soft-magnetic underlayer, the medium recording layer, the return pole, and the rear pole, the magnetic field direction in a region near the main pole is opposite to the magnetic field direction in a region near the return pole. In FIG. 17, values have a positive sign, and are distributed in an upward convex distribution around the main pole, according to one approach, and the downward concave distribution have a negative sign corresponding to a change of the direction of magnetic field along the magnetic circuit.

Figure 18:
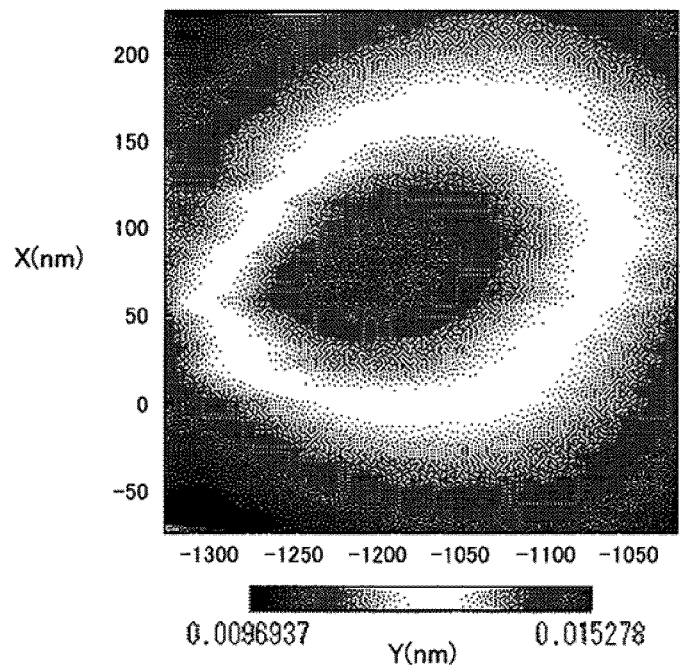
FIG. 18(a) shows a diagram showing high resolution data in a narrow range of sensor output corresponding to magnetic-field intensity while taking a direction of a magnetic field into consideration as a magnetic-field intensity sensor is raster-scanned in an XY direction with a Z-directional position of the magnetic-field intensity sensor being fixed in an estimation step of a main pole dimension according to the example.
FIG. 18(b) shows a schematic diagram showing a main pole dimension on an air bearing surface corresponding to a raster scan area.
Figure 18:
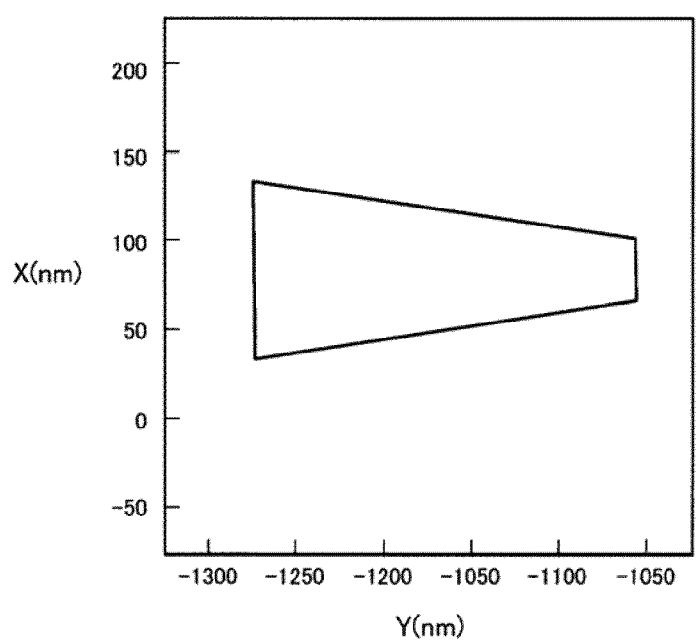
Figure 19:
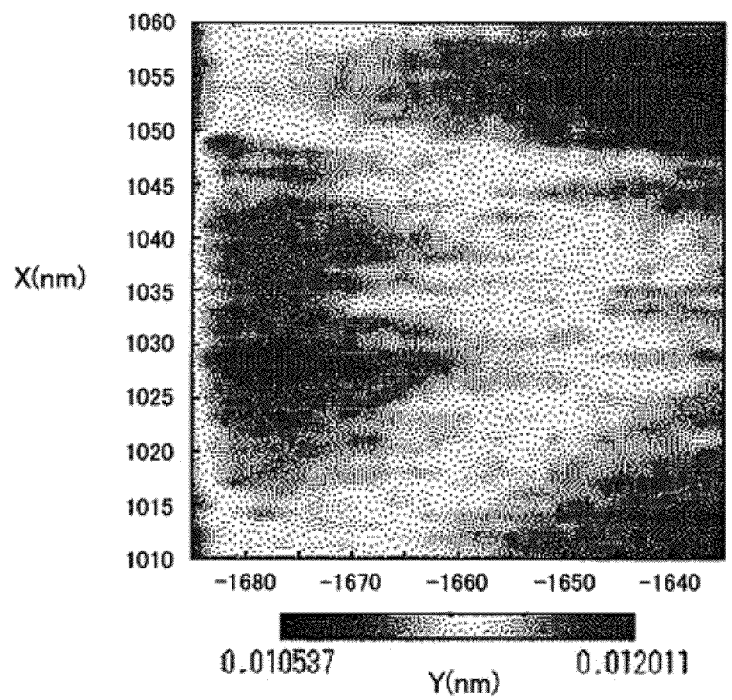
FIG. 19(a) shows a diagram showing highest resolution data in a narrow range of sensor output corresponding to magnetic-field intensity while taking a direction of a magnetic field into consideration as a magnetic-field intensity sensor is raster-scanned in an XY direction with a Z-directional position of the magnetic-field intensity sensor being fixed in an estimation step of a main pole dimension according to the example.
FIG. 19(b) shows a diagram showing FIG. 19(a) in a 3-D manner.
Figure 19:
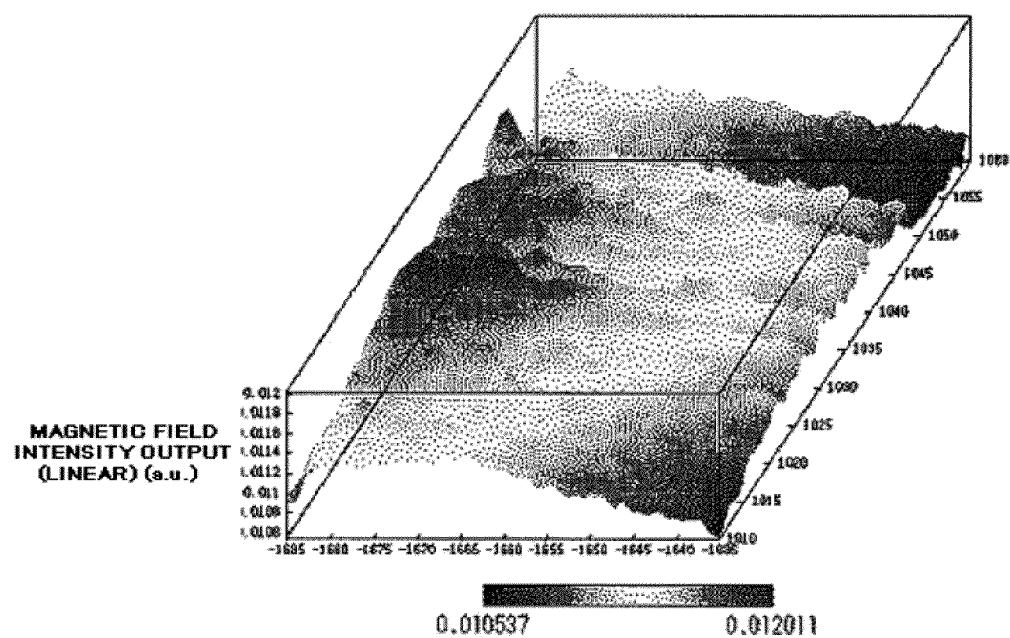

The purpose of measuring the magnetic-field intensity output distribution by raster-scanning the magneto-resistive element in the XY plane with displacement in the Z direction being fixed is to determine the point at which the magnetic-field intensity output is at its maximum, thus indicating the center of the main pole as described in the measurement procedure of flare point height. Therefore, based on the position of the main pole being roughly identified in FIG. 17, data obtained by scanning the element in further detail in a narrower area are shown in FIGS. 18 and 19. In FIG. 18(a), the presented area is 300 nm×300 nm, and the interval of the data points is 5 nm in each of X and Y directions, and the size of a corresponding main pole is shown by a schematic diagram in FIG. 18(b). FIG. 19 shows a result of further detailed scan performed about a point, at which the magnetic-field intensity output is at its maximum, so as to achieve a resolution of 1 nm. While noises are rather conspicuous in either of X and Y directions, the point at which the magnetic-field intensity output is at its maximum can be identified with a resolution of approximately 1 nm.

Figure 20:
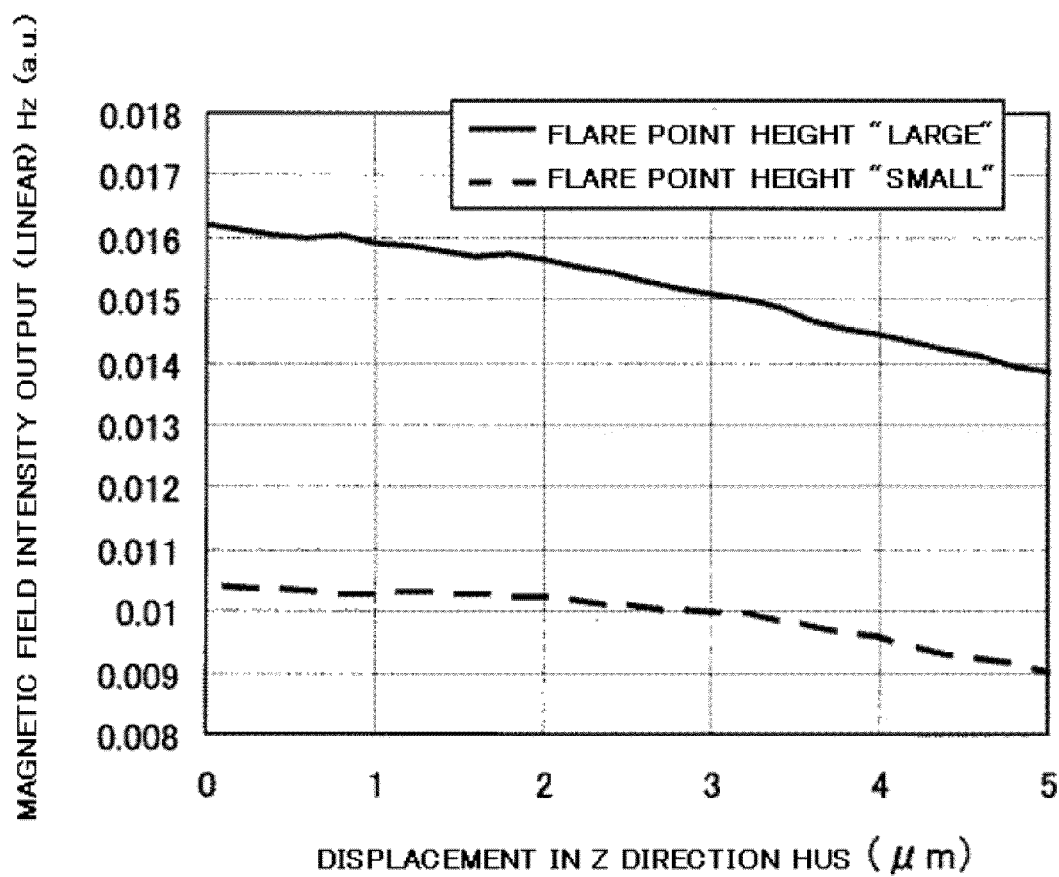
FIG. 20 is a diagram showing sensor output corresponding to magnetic-field intensity while taking a direction of a magnetic field into consideration as a distance is changed in a Z direction with a position in an XY direction of a magnetic-field intensity sensor being fixed at a center of a main pole in an estimation step of a main pole dimension according to an example, for each of two kinds of samples having different flare point heights.

Next, to prove the method of estimating the flare point height of the main pole according to the examples, two samples, which were known to have relatively large and small flare point heights, respectively, were prepared, and the magnetic-field intensity output distribution in the Z direction was measured while a position in the XY direction was fixed at the center of the main pole, at which the magnetic-field intensity output was at its maximum, the center having been identified according to the above method. FIG. 20 shows a result of the magnetic-field intensity output plotted against the displacement in the Z direction. While the result is slightly different in behavior from the simulation shown in FIG. 9, it is observed that the magnetic-field intensity output is attenuated as the slider is moved away from the origin in the Z direction. As previously described, since the accurate absolute value of the distance from the origin (the main pole center on the air bearing surface) in the Z direction is virtually undetectable, values obtained by further normalizing the gradients of magnetic-field intensity output in the Z direction with the magnetic-field intensity output itself are focused, according to some approaches. The normalized gradient values are plotted with respect to the magnetic-field intensity output, and both samples are compared in behavior to each other by the plotted values.

Figure 21:
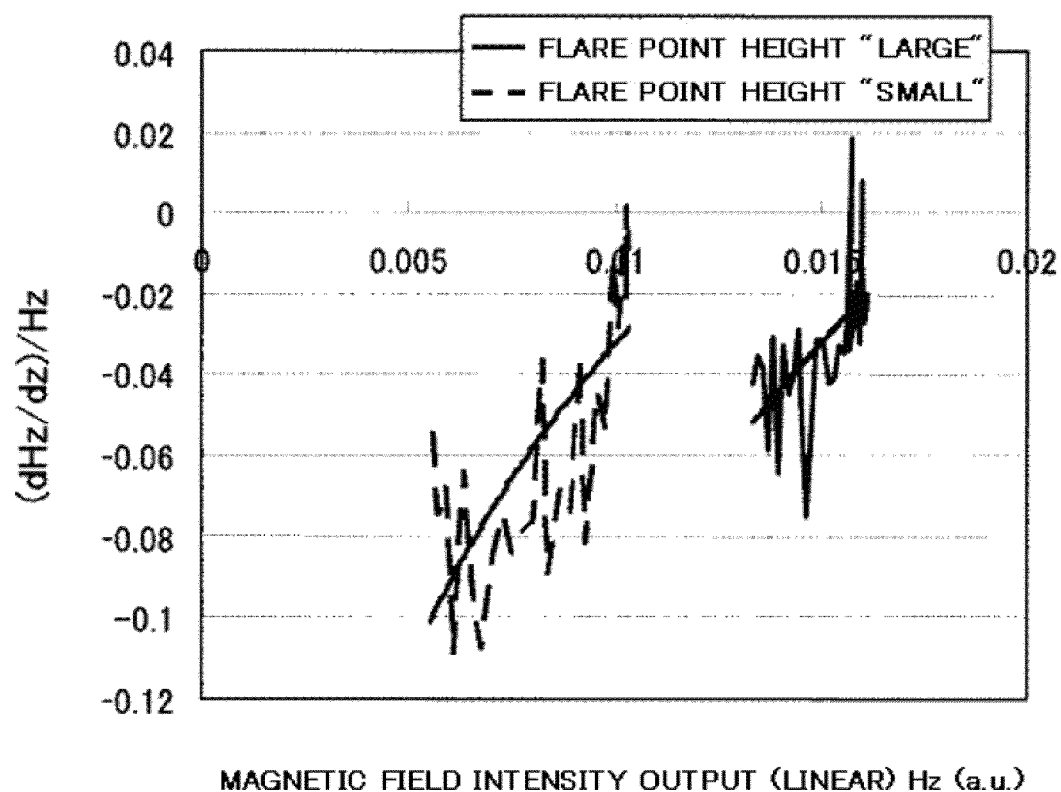
FIG. 21 is a diagram showing changes in value of a gradient, which is normalized with sensor output, in a Z direction of sensor output corresponding to magnetic-field intensity with respect to sensor output, while taking a direction of a magnetic field into consideration, as a distance is changed in the Z direction with a position in an XY direction of a magnetic-field intensity sensor being fixed at a center of a main pole in an estimation step of a main pole dimension according to an example, for each of two kinds of samples having different flare point heights.

FIG. 21 shows plots of the normalized gradients of magnetic-field intensity output, in one approach. Since the parameters configuring the figure do not include an absolute value of a distance from an air bearing surface of a write head to be examined to a measurement point, the analysis can be independent of the absolute value of the distance from the air bearing surface of the measurement point.

Since the difference of the flare point heights between the two kinds of samples prepared in this particular measurement happened to be too large, the two lines in the figure do not overlap with each other in terms of the magnetic-field intensity, so that no comparison of intensity gradient can be made at the same magnetic-field intensity value. However, if the respective graphs are averaged and extrapolated to each other, they obviously behave differently at the same magnetic-field intensity value (i.e., they are not on the same line), which illustrates that such differences in behavior may be caused by differences in flare point height. Therefore, it has been confirmed that when such data are separately compared to data in a database of measurement results of many standard samples being known in flare point height, flare point height of each of the samples of the experiment can be estimated, according to embodiments herein.

Since a main pole dimension in the down track direction is determined by material deposition thickness during head element formation in a wafer process, dimensional variation is not significantly large in this direction. However, since the dimension thereof in the cross-track direction, namely the writing track width, has many causes of variation during a wafer process, the dimension may be monitored and controlled in production. While change in the magnetic field intensity in the cross-track direction has a distribution as shown by the simulation in FIG. 12, a main pole dimension in the cross-track direction corresponds to a position at which the change in the magnetic field intensity is the steepest along the X direction.

Figure 22:
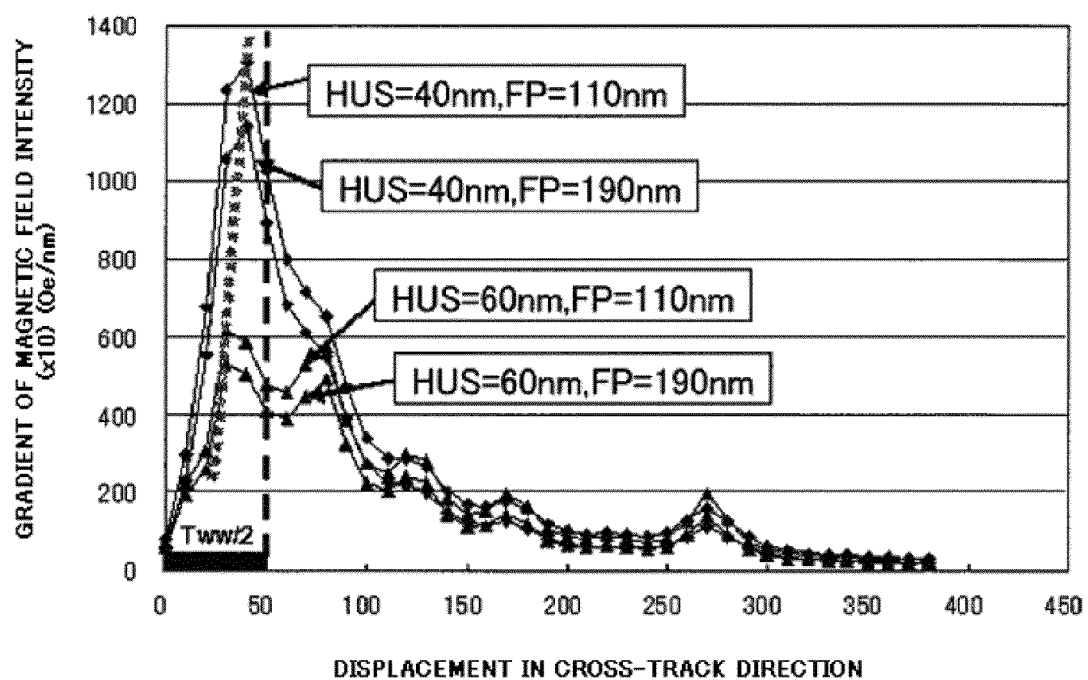
FIG. 22 is a diagram showing change in gradient of magnetic-field intensity in a cross-track direction (X direction) as a distance in a Z direction is changed in two different ways for each of two kinds of samples having different flare point heights according to one embodiment.

FIG. 22 shows a result of plotting gradients of the magnetic field intensity in the cross-track direction (X direction) with respect to a distance from the main pole center, according to one approach. In the simulation, since a main pole dimension in the cross-track direction is assumed to be 100 nm, a range of 0 nm to 50 nm on a graph corresponds to half the main pole dimension in the cross-track direction. On the other hand, it can be observed from the figure that as the measurement position in the Z direction approaches the air bearing surface of the main pole to be examined, the point where the magnetic field gradient is the steepest, namely the peak of each curve in the figure, gradually approaches the side-edge of the main pole in the cross-track direction. Since the peak position is independent of the dimension of the flare point height of the main pole, if the data curves are generated along the cross-track direction (X direction) at various distances in the Z direction, the peak points of magnetic field intensity gradients connected to each other for different Z-displacements form an asymptotic line approaching the side-edge of the main pole in the cross-track direction.

Figure 23:
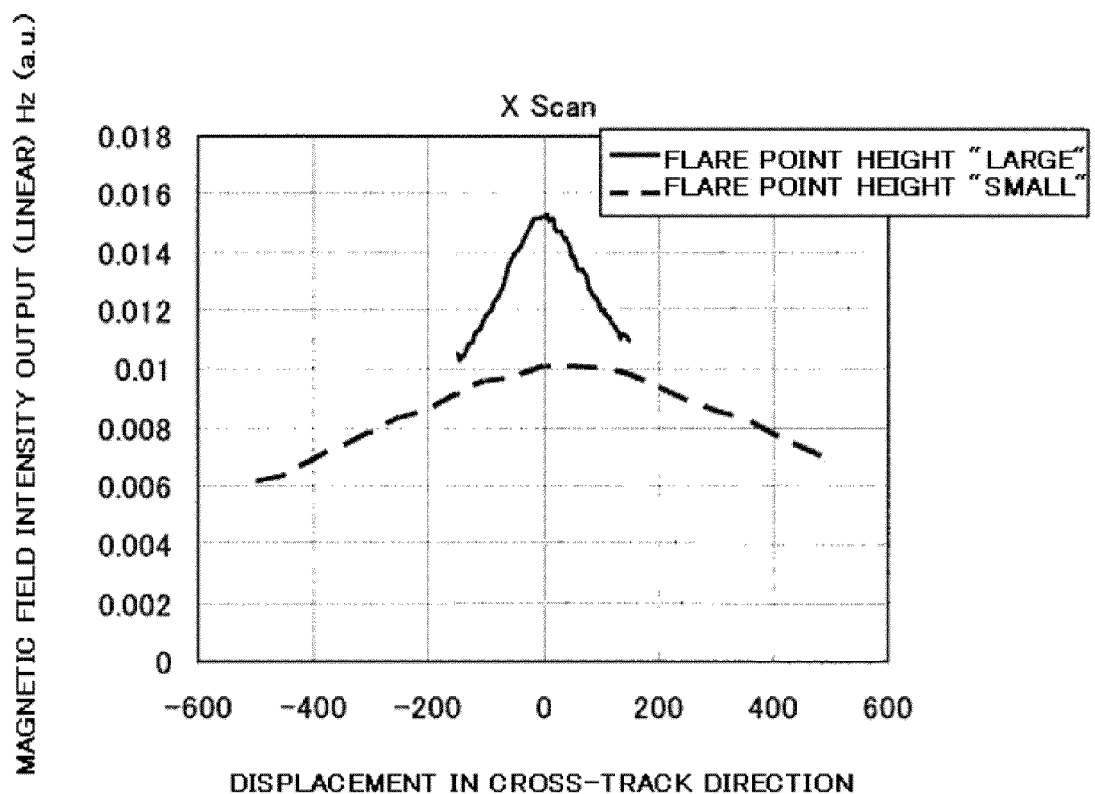
FIG. 23 is a diagram showing change in sensor output corresponding to magnetic-field intensity while taking a direction of a magnetic field into consideration with respect to a cross-track direction (X direction) as a distance is changed in the cross-track direction with a position in the down track direction (Y direction) of a magnetic-field intensity sensor being fixed at a center of a main pole in an estimation step of a main pole dimension according to an example, for each of two kinds of samples having different flare point height.

FIG. 23 shows change in the magnetic-field intensity output along the X axis (cross-track direction) passing through the center of the main pole of the samples having large and small flare point heights, according to one approach. The graph shows an example of a measurement result at a particular Z-directional position of samples having flare point heights being different from each other. It has been confirmed that, if the measurement is repeated while a Z-directional position is gradually changed as described before, and data from the measurement are analyzed according to the procedure described above, the position of the side-edge of the main pole in the cross-track direction may be calculated according to one embodiment, so that defective magnetic head sliders can be sorted out in a relatively early stage of a head slider manufacturing process based on the dimension data of the main pole in the cross-track direction, and the flare point height data of the main pole. This may reduce the loss of production control associated with other processing techniques.

Lastly, described is a method to correct an element height error caused by a relative displacement between a read head and a write head in the direction perpendicular to an air bearing surface generated in a wafer process according to one embodiment, taking advantage of the data of flare point height of the main pole estimated by the method explained herein. The flare point height H of the main pole is estimated in each of the steps 306, 207 and 107 of FIGS. 5-7. On the other hand, the element height L of the read element is determined by measurement of a resistance value of the read element in the rough lapping process step 302, 202 or 103 of the row bar or the head slider in FIGS. 5-7.

At a stage where the flare point height H of the main pole is estimated, the estimated flare point height H of the main pole is compared to the measured element height L of the read element, so that the relative displacement between the read head and the write head in the direction perpendicular to the air bearing surface generated in the wafer process is calculated according to one embodiment, and a tilt angle in tilt lapping process may be adjusted based on the calculated relative displacement in the subsequent rough lapping process step of the row bar or head slider, resulting in the element height error caused by the relative displacement between the read head and the write head in the direction perpendicular to the air bearing surface generated in the wafer process being corrected.

What is claimed is:

1. A method of manufacturing a perpendicular magnetic recording head comprising:
a main pole having a flare point at which a width in a cross-track direction begins to increase, wherein a width of a portion of the main pole is constant in the cross-track direction from the flare point to an air bearing surface;
a return pole being magnetically coupled with the main pole at a side opposite to the air bearing surface; and
a coil interlinked with a magnetic circuit comprised of the main pole and the return pole,
wherein the magnetic recording head is formed by:
forming a plurality of head elements on a wafer, each head element comprising: the return pole, the coil, and the main pole;
cutting the wafer into respective head elements so that individual head sliders are formed;
calculating a ratio of an amplitude of an electrical signal applied to the coil of the write head on the head slider to an amplitude of output from an independent magnetic field sensor not embedded in the head slider, wherein the independent magnetic field sensor is disposed near the main pole so as to be opposed to the main pole across the air bearing surface, wherein the ratio is calculated while a displacement between the main pole and the magnetic field sensor is swept; and
determining a flare point height of the main pole from the calculated amplitude ratio.

2. The method of manufacturing a perpendicular magnetic recording head according to claim 1, wherein a dimension in the cross-track direction of the main pole is estimated from the calculated amplitude ratio.

3. The method of manufacturing a perpendicular magnetic recording head according to claim 2, further comprising:
estimating the dimension in the cross-track direction of the main pole such that a two-dimensional signal amplitude ratio distribution in a plane parallel to the air bearing surface of the head slider including a head element to be examined is measured while a position is sequentially changed in a normal direction to the air bearing surface;
comparing a gradient of measured values in each of parallel and normal directions to the air bearing surface to a gradient of values measured for the head element being beforehand known in main pole dimension; and estimating a dimension in the cross-track direction of the main pole of the head element to be examined based on the comparison.

4. The method of manufacturing a perpendicular magnetic recording head according to claim 1, further comprising:
measuring a phase difference between an electrical signal applied to the coil on the head slider and an output from a magnetic field sensor, wherein the magnetic field sensor is disposed near the main pole so as to be opposed to the main pole across the air bearing surface;
sweeping the displacement between the main pole and the magnetic field sensor; and
estimating a direction of polarity of a magnetic field generated near the main pole.

5. The method of manufacturing a perpendicular magnetic recording head according to claim 1, wherein at least one of a magneto-resistive element including a giant magneto-resistive effect (GMR) element and a tunnel magneto-resistive effect (TMR) element is used as the magnetic field sensor.

6. The method of manufacturing a perpendicular magnetic recording head according to claim 1, wherein a fine adjustment stage having a degree of freedom of three-dimensional translation is used as a means for sweeping the displacement between the main pole and the magnetic field sensor.

7. The method of manufacturing a perpendicular magnetic recording head according to claim 1, wherein a piezoelectric stage is used as a fine adjustment stage for positioning the independent magnetic field sensor relative to the write head.

8. The method of manufacturing a perpendicular magnetic recording head according to claim 1, further comprising:
estimating the flare point height of the main pole such that a position with the highest signal intensity is specified from a two-dimensional signal amplitude ratio distribution in a plane parallel to the air bearing surface of the head slider including a head element to be examined;
measuring an intensity gradient in a normal direction to the air bearing surface;
comparing the intensity gradient at said position to an intensity gradient database measured for a head element being beforehand known in main pole dimension; and
estimating a flare point height of the main pole of the head element to be examined based on the comparison.

9. A method of manufacturing a perpendicular magnetic recording head comprising:
a main pole, including:
a flare point defined as a point where a width in a cross-track direction begins to increase; and
a portion being constant in width in the cross-track direction from the flare point to an air bearing surface;
a return pole being magnetically coupled with the main pole at a side opposite to the air bearing surface; and
a coil interlinking with a magnetic circuit including the main pole and the return pole,
wherein the magnetic recording head is formed by:
forming a plurality of head elements on a wafer, each head element having the return pole, the coil, and the main pole;
cutting the wafer into the respective head elements so that individual head sliders are formed;
calculating a ratio of an amplitude of an electric signal applied to the coil on the head slider to an amplitude of output from an independent magnetic field sensor not embedded in the slider, wherein the magnetic field sensor is disposed near the main pole so as to be opposed to the main pole across the air bearing surface;
sweeping a displacement between the main pole and the magnetic field sensor;
estimating a flare point height of the main pole from the calculated amplitude ratio;
estimating a dimension in the cross-track direction of the main pole from the calculated amplitude ratio; and
sorting non-defective products and defective products based on the estimated flare point height of the main pole and the estimated dimension in the cross-track direction thereof, respectively.

10. The method of manufacturing a perpendicular magnetic recording head according to claim 9, further comprising:
estimating the flare point height of the main pole such that a position with the highest signal intensity is specified from a two-dimensional signal amplitude ratio distribution in a plane parallel to an air bearing surface of the head slider including a head element to be examined;
measuring an intensity gradient in a normal direction to the air bearing surface;
comparing the intensity gradient at said position to an intensity gradient database measured for a head element being beforehand known in main pole dimension; and
estimating the flare point height of the main pole of the head element to be examined based on the comparison.

11. The method of manufacturing a perpendicular magnetic recording head according to claim 9, further comprising:
estimating a dimension in the cross-track direction of the main pole such that a two-dimensional signal amplitude ratio distribution in a plane parallel to an air bearing surface of the head slider including a head element to be examined is measured while a position is sequentially changed in a normal direction to the air bearing surface;
comparing a gradient of measured values in each of parallel and normal directions to the air bearing surface to a gradient of values measured for a head element being beforehand known in main pole dimension; and
estimating a dimension in the cross-track direction of the main pole of the head element to be examined based on the comparison.

12. A method of manufacturing a perpendicular magnetic recording head comprising:
a write head having:
a main pole, including:
a flare point at a point where a width in a cross-track direction begins to increase; and
a portion being constant in width in the cross-track direction from the flare point to an air bearing surface;
a return pole being magnetically coupled with the main pole at a side opposite to the air bearing surface; and
a coil interlinking with a magnetic circuit including the main pole and the return pole; and
a read head disposed adjacently to the write head, the read head comprising:
a read element; and
upper and lower magnetic shields interposing the read element between them,
wherein the method includes:
forming a plurality of head elements on a wafer, each head element having the read head and the write head;
cutting the wafer into row bars, each row bar including a plurality of head elements;
lapping a cut surface of each of the row bars such that a flare point height of the main pole included in a head element on each row bar and element height of the read element are determined;

cutting each of the row bars into the respective head elements so that individual head sliders are formed;

calculating a ratio of an amplitude of an electrical signal applied to the coil on the head slider to an amplitude of output from an independent magnetic field sensor not embedded in the slider, wherein the magnetic field sensor is disposed near the main pole so as to be opposed to the main pole across the air bearing surface;

sweeping a displacement between the main pole and the magnetic field sensor;

estimating a flare point height of the main pole from the calculated amplitude ratio;

measuring a resistance value of the read element to measure element height thereof;

comparing the estimated flare point height of the main pole to the measured element height of the read element;

calculating an overlay displacement between the write head and the read head on the wafer; and in the lapping step, adjusting a tilt angle of the row bar based on the calculated relative displacement, thereby correcting the overlay displacement.

13. The method of manufacturing a perpendicular magnetic recording head according to claim 12, wherein the tilt lapping step of the row bar performed to correct the calculated relative displacement is performed in a subsequent lapping step.

14. The method of manufacturing a perpendicular magnetic recording head according to claim 12, further comprising:

estimating the flare point height of the main pole such that a position with the highest signal intensity is specified from a two-dimensional signal amplitude ratio distribution in a plane parallel to an air bearing surface of the head slider including a head element to be examined;

measuring an intensity gradient in a normal direction to the air bearing surface;

comparing the intensity gradient at said position to an intensity gradient database measured for a head element being beforehand known in main pole dimension;

estimating a flare point height of the main pole of the head element to be examined based on the comparison.

15. A method of manufacturing a perpendicular magnetic recording head comprising:

a write head, including:
  a main pole, comprising:
    a flare point at a point where a width in a cross-track direction begins to increase; and
    a portion being constant in width in the cross-track direction from the flare point to an air bearing surface;
  a return pole being magnetically coupled with the main pole at a side opposite to the air bearing surface; and
  a coil interlinking with a magnetic circuit including the main pole and the return pole; and a read head disposed adjacently to the write head, the read head comprising:
  a read element; and
  upper and lower magnetic shields interposing the read element between them, wherein the method includes:
  forming a plurality of head elements on a wafer, each head element having the read head and the write head;
  cutting the wafer into row bars, each row bar including a plurality of head elements;
  cutting each of the row bars into respective head elements so that individual head sliders are formed;
  lapping a surface of each of the head sliders to become an air bearing surface such that a flare point height of the main pole included in a head element and an element height of the read element on the head slider are determined;
  calculating a ratio of an amplitude of an electrical signal applied to the coil on the head slider to an amplitude of output from an independent magnetic field sensor not embedded in the slider, wherein the magnetic field sensor is disposed near the main pole so as to be opposed to the main pole across the air bearing surface
  sweeping a displacement between the main pole and the magnetic field sensor;
  estimating a flare point height of the main pole from the calculated amplitude ratio;
  measuring a resistance value of the read element to determine an element height thereof;
  comparing the estimated flare point height of the main pole to the measured element height of the read element;
  calculating an overlay displacement between the read head and the write head on the wafer based on the comparison; and
  in the lapping step, adjusting a tilt angle of the head slider based on the calculated relative displacement, thereby correcting the overlay displacement.

16. The method of manufacturing a perpendicular magnetic recording head according to claim 15, wherein the tilt lapping process of the head slider performed to correct the calculated relative displacement is performed in a subsequent lapping step.

17. The method of manufacturing a perpendicular magnetic recording head according to claim 15, further comprising:

estimating the flare point height of the main pole such that a position with the highest signal intensity is specified from a two-dimensional signal amplitude ratio distribution in a plane parallel to an air bearing surface of the head slider including a head element to be examined;

measuring an intensity gradient in a normal direction to the air bearing surface;

comparing the intensity gradient at said position to a intensity gradient database measured for a head element being beforehand known in main pole dimension; and estimating a flare point height of the main pole of the head element to be examined based on the comparison.

* * * * *